(12) United States Patent
Nakajima et al.

(10) Patent No.: US 7,884,859 B2
(45) Date of Patent: Feb. 8, 2011

(54) DIGITAL CAMERA

(75) Inventors: Yasumasa Nakajima, Nagano (JP); Shuji Tsuji, Nagano (JP); Masanobu Shirakawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 927 days.

(21) Appl. No.: 10/543,056

(22) PCT Filed: Dec. 25, 2003

(86) PCT No.: PCT/JP03/16894

§ 371 (c)(1),
(2), (4) Date: Dec. 6, 2007

(65) Prior Publication Data

US 2008/0074502 A1    Mar. 27, 2008

(30) Foreign Application Priority Data

| Jan. 21, 2003 | (JP) | ............................ 2003-012058 |
| Jan. 27, 2003 | (JP) | ............................ 2003-017485 |
| Jan. 27, 2003 | (JP) | ............................ 2003-017555 |

(51) Int. Cl.
*H04N 5/76* (2006.01)

(52) U.S. Cl. ............. 348/231.3; 348/231.2; 348/231.4; 348/231.5; 348/231.6

(58) Field of Classification Search ... 348/231.1–231.9, 348/231.99, 207.1, 207.2, 239
See application file for complete search history.

(56) References Cited

U.S. PATENT DOCUMENTS

| 6,249,313 | B1 * | 6/2001 | Nishi ...................... 348/231.9 |
| 6,621,524 | B1 * | 9/2003 | Iijima et al. ................. 348/584 |
| 6,762,791 | B1 * | 7/2004 | Schuetzle ................ 348/231.3 |

FOREIGN PATENT DOCUMENTS

| JP | 11-8818 A | | 1/1999 |
| JP | 11-127323 A | | 5/1999 |
| JP | 11-168689 A | | 6/1999 |
| JP | 11-196362 A | | 7/1999 |
| JP | 11-234615 A | | 8/1999 |
| JP | 11234615 A | * | 8/1999 |
| JP | 11-298764 A | | 10/1999 |
| JP | 2000-358206 A | | 12/2000 |
| JP | 2001-45352 A | | 2/2001 |
| JP | 2001-177764 A | | 6/2001 |
| JP | 2001-285420 A | | 10/2001 |
| JP | 2001-309219 A | | 11/2001 |
| JP | 2001-326846 A | | 11/2001 |
| JP | 2002-44416 A | | 2/2002 |
| JP | 2002-218212 A | | 8/2002 |

* cited by examiner

*Primary Examiner*—Yogesh K Aggarwal
(74) *Attorney, Agent, or Firm*—Sughrue Mion, PLLC

(57) ABSTRACT

A digital camera including a layout inputting unit that inputs a layout in drawing a digital image, an internal memory stored with the inputted layout, a selection receiving unit (S400) that receives selection of the layout stored in the internal memory, an object image outputting unit (S410, S420) that outputs the digital image outputted by the converting unit to a removable memory by being related to the layout selected by the selection receiving unit, and a layout unit (S440) that outputs the layout stored in the internal memory in the removable memory stored with the digital image by the object image outputting unit.

3 Claims, 21 Drawing Sheets

DIGITAL CAMERA

TECHNICAL FIELD

The present invention relates to a digital camera.

BACKGROUND ART

There is a use of recording an object as, for example, a material of a synthesized image in a digital camera. A synthesized image is widely used for printing a letter of greeting with a photograph, a photograph seal with a frame or the like.

In a background art, there is known a digital camera for recording a synthesized image provided by synthesizing a digital image (existing image) expressing embroidery or background and a digital image (object image) expressing an object to an external memory (refer to, for example, Patent Reference 1).

Further, there is known a digital camera for recording information of a frame for printing an object image by clipping the object image in accordance with an aspect ratio of a photograph of a certificate or the like to a memory along with the object image (refer to, for example, Patent Reference 2).

(Patent Reference 1)
JP-A-2001-45352
(Patent Reference 2)
JP-A-2000-358206 (paragraph 0075)

However, according to the digital camera disclosed in Patent Reference 1, the existing image and the object image are synthesized before being recorded to the external memory and therefore, the object image before being synthesized is not recorded to the external memory. Therefore, the object image cannot be diverted to a use other than a use of synthesizing the object image with the existing image selected before taking the image.

Further, according to the digital camera disclosed in Patent Reference 2, there is not an interface for inputting the information of the frame to the digital camera and therefore, the information of the frame which can be utilized by a user is limited.

According to a first object of the invention, the object is constituted by providing a digital camera capable of selecting a variety of layouts and capable of recording an object image drawably by a selected layout and drawably separately from the selected layout.

According to a second object of the invention, the object is constituted by providing a digital camera capable of selecting a variety of existing images and capable of recording an object image synthesized with a selected existing image and drawably separately from the selected existing image.

DISCLOSURE OF THE INVENTION

In order to achieve the above-described first object, a digital camera according to the first invention is characterized in comprising an optical system for focusing an optical image of an object, a converting unit that converts the focused optical image of the object into a digital image, a layout input unit that inputs a layout in drawing the digital image outputted by the converting unit, an internal memory stored with the inputted layout, a selection receiving unit that receives selection of the layout stored in the internal memory, an object image outputting unit that outputs the digital image outputted by the converting unit to a removable memory by being related to the layout selected by the selection receiving unit, and a layout outputting unit that outputs the layout stored in the internal memory to the removable memory stored with the digital image by the object image outputting unit. There is not brought about a drawback that the layout selected before interchanging the removable memory cannot be selected after interchanging the removable memory by making a user select not the layout stored in the removable memory but the layout stored in the internal memory. Further, a user can select a variety of layouts by enabling to input the layouts from a communication network or the like. Further, by outputting the digital image of the object by being related to the selected layout to the removable memory, the object image can be recorded drawably by the selected layout and drawably separately from the selected layout. Further, by outputting the layout to the removable memory along with the digital image of the object, in a drawing apparatus of a printer or the like, the object image can firmly be drawn in accordance with the selected layout in the digital camera.

Further, the digital camera according to the first invention is characterized in that the layout outputting unit outputs the layout selected by the selection receiving unit to the removable memory after the digital image outputted to the removable memory is outputted by the converting unit. By outputting the layout to the removable memory by such timing, the selected layout can firmly be outputted to the removable memory without waste.

Further, the digital camera according to the first invention is characterized in that the layout outputting unit outputs the layout selected by the selection receiving unit to the removable memory before the digital image outputted to the removable memory is outputted by the converting unit. By outputting the layout to the removable memory by such timing, a time interval in successively recording the object image can be shortened.

Further, the digital camera according to the first invention is characterized in that the layout outputting unit outputs the layout stored in the internal memory to the removable memory at each time of interchanging the removable memory. By outputting the layout to the removable memory by such timing, a time interval in successively recording the object image can be shortened.

Further, the digital camera according to the first invention is characterized in that the layout outputting unit outputs only the layout in the layout stored in the internal memory, which is not stored in the removable memory to the removable memory. By outputting only the layout that is not stored in the removable memory to the removable memory, waste of a storing region of the removable memory can be prevented.

In order to achieve the above-described second object, a digital camera according to the second invention is characterized in comprising an optical system for focusing an optical image of an object, a converting unit that converts the focused optical image of the object into a digital image, an inputting unit that inputs an existing image to be synthesized with the digital image outputted by the converting unit, an internal memory stored with the inputted existing image, a selection receiving unit that receives selection of the existing image stored in the internal memory, an object image outputting unit that outputs the digital image outputted by the converting unit to a removable memory by being related to the existing image selected by the selection receiving unit, and an existing image outputting unit that outputs the existing image stored in the internal memory to the removable memory stored with the digital image by the object image outputting unit. There is not brought about a drawback that the existing image selected before interchanging the removable memory cannot be selected after interchanging the removable memory by making a user select not the existing image stored in the removable memory but the existing image stored in an internal memory. Further, a user can select a variety of the existing images by causing the existing images to enable to input from the removable memory, a communication network or the like. Further, by outputting the digital image of the object to the removable memory by being related to the selected existing image, the object image can be recorded drawably by being synthesized with the selected existing image and drawably separately from the existing image. Further, by outputting the existing image to the removable memory along with the digital image of the object, in a drawing apparatus of a printer or the like, the object image can firmly be synthesized with the existing image selected in the digital camera to draw.

Further, the digital camera according to the second invention is characterized in that the existing image outputting unit outputs the existing image selected by the selection receiving unit to the removable memory after the digital image outputted to the removable memory is outputted by the converting unit. By outputting the existing image to the removable memory by such timing, the selected existing image can firmly be outputted to the removable memory without waste.

Further, the digital camera according to the second invention is characterized in that the existing image outputting unit outputs the existing image selected by the selection receiving unit to the removable memory before the digital image outputted to the removable memory is outputted by the converting unit. By outputting the existing image to the removable memory by such timing, a time interval in successively recording the object image can be shortened.

Further, the digital camera according to the second invention is characterized in that the existing image outputting unit outputs the existing image stored in the internal memory to the removable memory at each time of interchanging the removable memory. By outputting the existing image to the removable memory by such timing, a time interval in successively recording the object image can be shortened.

Further, the digital camera according to the second invention is characterized in that the existing image outputting unit outputs only the existing image of the existing image stored in the internal memory, which is not stored in the removable memory to the removable memory. By outputting only the existing image that is not stored in the removable memory to the removable memory, waste of a storing region of the removable memory can be prevented.

In order to achieve the above-described object, a digital camera according to a third invention is characterized in comprising an optical system for focusing an optical image of an object, a converting unit that converts the focused optical image of the object into a digital image, a layout inputting unit that inputs a layout in drawing the digital image outputted by the converting unit, an internal memory stored with the inputted layout, a selection receiving unit that receives selection of the layout stored in the internal memory, an object image outputting unit that outputs the digital image outputted by the converting unit to the removable memory by being related to the layout selected by the selection receiving unit, a layout outputting unit that outputs the layout stored in the internal memory to the movable memory stored with the digital image by the object image outputting unit, and a drawing controlling unit that causes a drawing apparatus to draw the digital image stored in the removable memory based on the layout stored in the removable memory. By storing not an image constituted by editing the object image based on the layout but the object image per se to the removable memory, the object image can be recorded drawably by the selected layout and drawably separately from the selected layout. Further, there is not brought about a drawback that when the existing image is recorded, the layout selected before interchanging the removable memory cannot be selected after interchanging the removable memory by making a user select not the layout stored in the removable memory but the layout stored in the internal memory. Further, by enabling to input the layout from the removable memory, a communication network or the like, a user can select a variety of layouts. Further, by outputting the layout to the removable memory drawn with the digital image of the object, in a drawing apparatus of a printer or the like, the object image can firmly be drawn in accordance with the selected layout in the digital camera.

Further, the digital camera according to the third invention is characterized in that the drawing controlling unit displays the digital image stored in the removable memory on a display based on the layout stored in the removable memory.

Further, the digital camera according to the third invention is characterized in that the drawing controlling unit causes a printer to print the digital image stored in the removable memory based on the layout stored in the removable memory.

In order to achieve the above-described second object, a digital camera according to the fourth invention is characterized in comprising an optical system for focusing an optical image of an object, a converting unit that converts the focused optical image of the object into a digital image, a layout inputting unit that inputs an existing image to be synthesized with the digital image outputted by the converting unit, an internal memory stored with the inputted existing image, a selection receiving unit that receives selection of the existing image stored in the internal memory, an object image outputting unit that outputs the digital image outputted by the converting unit to the removable memory by being related to the existing image selected by the selection receiving unit, a layout outputting unit that outputs the existing image stored in the internal memory to the removable memory stored with the digital image by the object image outputting unit, and a drawing controlling unit that causes a drawing apparatus to synthesize the digital image and the existing image stored in the removable memory to draw. By storing not an image constituted by synthesizing the object image with the existing image but the object image per se to the involatile memory, the object image can be recorded drawably by the selected existing image and drawably separately from the selected existing image. Further, the there is not brought about a drawback that when the object image is recorded, the existing image selected before interchanging the removable memory cannot be selected after interchanging the removable memory by making a user select not the existing image stored in the removable memory but the existing image stored in an internal memory. Further, by enabling to input the existing image from the removable memory, a communicating network or the like, a user can select a variety of the existing images. Further, by outputting the existing image to the removable memory along with the digital image of the object, in a drawing apparatus of a display, a printer or the like, the object image can firmly be drawn in accordance with the selected existing image in the digital camera.

Further, the digital camera according to the fourth invention is characterized in that the drawing controlling unit causes a display to synthesize the digital image and the existing image stored in the removable memory to display.

Further, the digital camera according to the fourth invention is characterized in that the drawing controlling unit causes a printer to synthesize the digital image and the existing image stored in the removable memory to print.

In order to achieve the above-described first object, a digital camera according to the fifth invention is characterized in comprising an optical system for focusing an optical image of an object, a converting unit that converts the focused optical image of the object into a digital image, a selection receiving unit that receives selection of a layout in drawing the digital image and a layout stored in an external storing unit, a layout inputting unit that inputs the selected layout, an internal memory stored with the inputted layout, an object image outputting unit that stores the digital image converted by the converting unit to a removable memory by being related to the layout selected by the selection receiving unit, and a layout outputting unit that stores the layout stored in the internal memory in the removable memory stored with the digital image by the object image outputting unit. By enabling to select the layout stored in the external storing unit, a user can select a variety of layouts. Further, there is not brought about a drawback that in the case in which in order to store the selected layout to the internal memory, the layout is selected from the external storing unit for utilizing an attachable and detachable external record medium of, for example, the removable memory or the like, even when the removable memory is interchanged after selecting the layout, the digital image cannot be related to the layout which has been selected before interchanging the removable memory. Further, by storing not an image constituted by editing the object image based on the layout but the object image per se to the removable memory, the object image can be recorded drawably by the selected layout and drawably separately from the selected layout. Further, by storing the layout to the removable memory along with the digital image of the object, in a drawing apparatus of a printer or the like, the object image can firmly be drawn in accordance with the layout selected in the digital camera.

In order to achieve the above-described second object, a digital camera according to the sixth invention is characterized in comprising an optical system for focusing an optical image of an object, a converting unit that converts the focused optical image of the object into a digital image, a selection receiving unit receives selection of an existing image to be synthesized with the digital image stored in an external storing unit, an existing image inputting unit that inputs the selected existing image, an internal memory stored with the inputted existing image, an object image outputting unit that stores the digital image converted by the converting unit to a removable memory by being related to the existing image selected by the selection receiving unit, and an existing image outputting unit that stores the existing image stored in the internal memory in the removable memory stored with the digital image by the object image outputting unit. By enabling to select the existing image stored in the external storing unit, a user can select a variety of the existing images. Further, there is not brought about a drawback that in the case in which in order to store the selected existing image to the internal memory, the existing image is selected from the external storing unit for utilizing an attachable and detachable external record medium of, for example, the removable memory or the like, even when the removable memory is interchanged after selecting the existing image, the digital image cannot be related to the existing image which has been selected before interchanging the removable image. Further, by storing not an image constituted by synthesizing the object image with the existing image but the object image per se to the removable memory, the object image can be recorded drawably by the selected existing image and drawably separately from the selected existing image. Further, by storing the existing image to the removable memory along with the digital image of the object, in a drawing apparatus of a printer or the like, the object image can firmly be drawn in accordance with the existing image selected in the digital camera.

Further, respective functions of a plurality of units provided to the invention can be realized by a hardware resource a function of which is specified by the constitution per se, a hardware resource a function of which is specified by a program, or a combination of these. Further, the respective functions of the plurality of units are not limited to functions realized by hardware resources respective of which are physically independent from each other. Further, the invention can be specified not only as an invention of apparatus, but also as an invention of a program, as an invention of a record medium provided as a program, or an invention of a method.

BEST MODE FOR CARRYING OUT THE INVENTION

A mode for carrying out the invention will be explained based on a plurality of embodiments as follows.

First Embodiment

Figure 2:
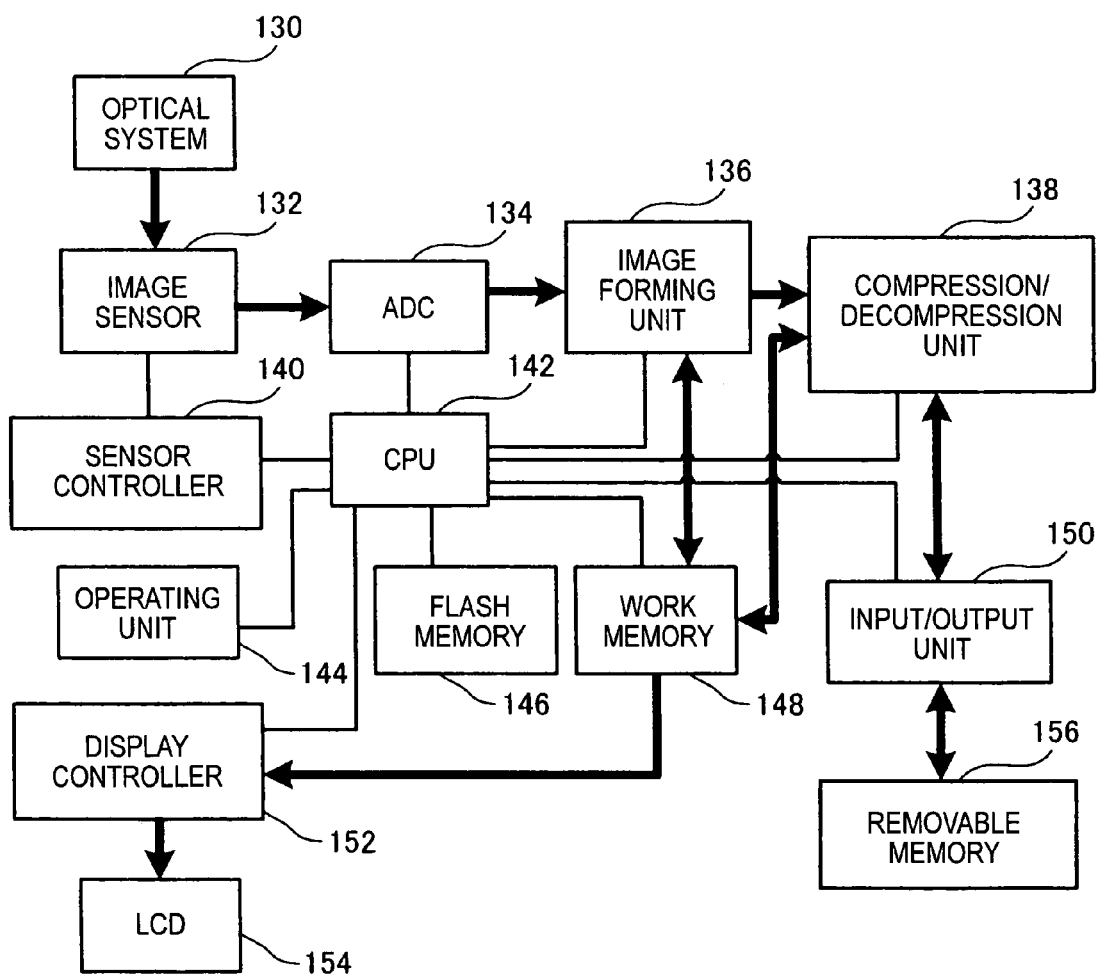
FIG. 2 is a block diagram according to the first embodiment.
Figure 3:
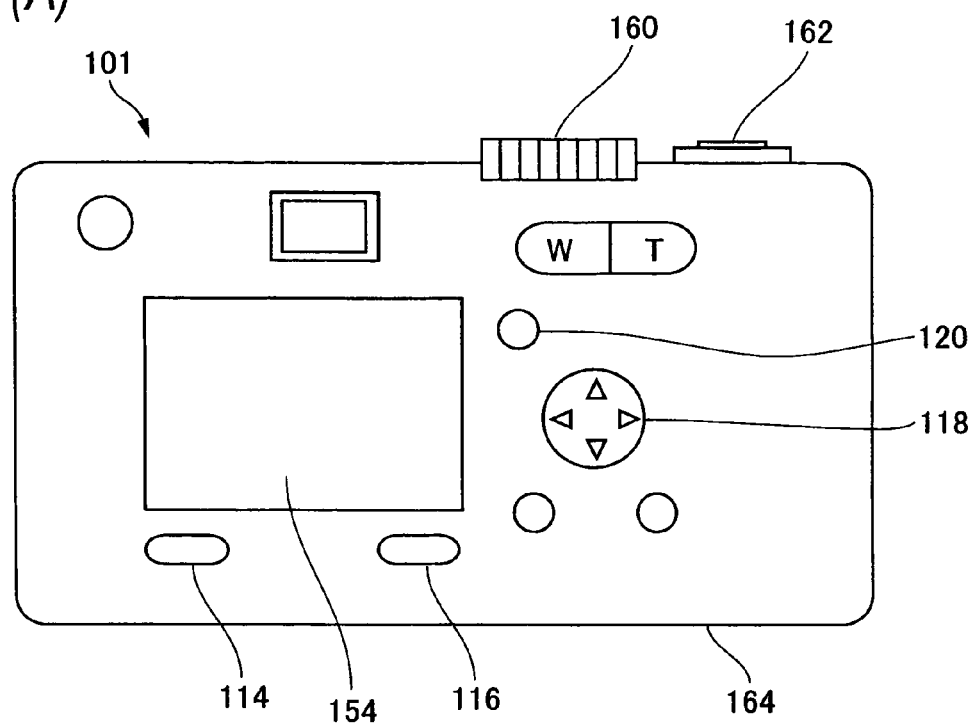
FIG. 3(A) is a front view according to the first embodiment and FIG. 3(B) is a rear view according to the first embodiment.
Figure 3:
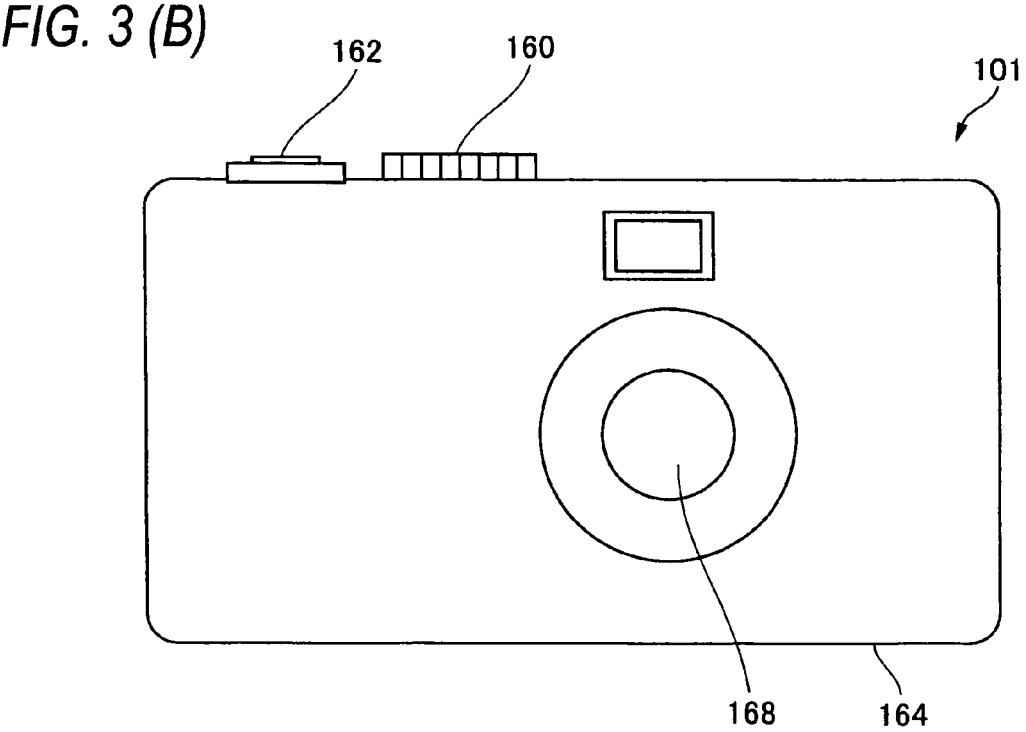

FIG. 2 is a block diagram showing a constitution of a digital camera 101 according to a first embodiment of the invention. FIGS. 3(A) and 3(B) are respectively a rear view and a front view showing an outlook of the digital camera 101.

An optical system 130 is constituted by a lens 168, a diaphragm and the like contained in a cabinet 164. The optical system 130 focuses an optical image of an object on a light receiving face of an image sensor 132.

The image sensor 132 as a converting unit is an area image sensor having a photoelectric conversion element discretely arranged in a two-dimensional space and a charge transfer element of CCD (Charge Coupled Device) or the like. The image sensor 132 is controlled by a sensor controller 140. The image sensor 132 stores a charge provided by photoelectric conversion for each photoelectric conversion element for a constant period of time and outputs an electric signal in accordance with a light receiving amount of each photoelectric conversion element. A color image can be formed by providing complementary color filters or 4 colors of C (Cyan), M (Magenta), Y (Yellow), and G (Green) or primary color filters of R (Red), G (Green), and B (Blue).

A/D conversion portion (ADC) 134 as a converting unit quantizes an analog signal outputted from the image sensor 132 to convert into a digital signal. Specifically, for example, ADC 134 executes a processing of reducing noise included in the analog signal, a processing of controlling a level of the analog signal by controlling a gain, a quantizing processing and the like.

An image forming portion 136 as a converting unit subjects the digital signal outputted from ADC 134 to an image forming processing, white balance correction, γ correction, a color space conversion or the like to output image data representing gray scale values of R, G, B or gray scales of Y, Cb, Cr or the like for each pixel. Further, the image forming processing mentioned here is a processing of outputting digital image data having three gray scale values of RGB or YCbCr for each pixel by interpolating pixels comprising darkness information of one color by darkness information of a different color of pixels at vicinities thereof.

A compressing/decompressing portion 138 as an object image outputting unit compresses or decompresses the digital image data. Specifically, the digital image data is compressed by subjecting the digital image data to a sequence conversion and entropy coding and the digital image data is decompressed by subjecting the digital image data to conversions inverse thereto. Specifically, the digital image data is compressed by using, for example, discrete cosine conversion, a wavelet conversion, Langress coding, Huffman coding or the like.

An input/output portion 150 is provided with a memory controller and a card slot for attachably and detachably connecting a removable memory 156. The memory controller is controlled by CPU 142 to store and read data to and from the removable memory 156. The digital image data compressed by the compressing/decompressing portion 138 is stored in the removable memory 156 as an involatile memory by the input/output portion 150.

An operating portion 144 as a layout inputting unit and a selection receiving unit is provided with a dial switch 160, push button switches 114, 116, 120, a cross key 118, a shutter switch 162 and the like. The dial switch 160 is a dial switch for setting modes of an image taking mode, an image reproducing mode, a direct print mode and the like in accordance with a rotational angle thereof. The push button switch 120 is a switch for calling a menu on LCD (Liquid Crystal Display) 154. The push button switches 114, 116 and the cross key 118 are switches for operating a menu displayed on LCD 154. The shutter switch 162 is a switch for inputting stationary image record instruction. In the image taking mode, stationary image record instruction can be inputted by pushing the shutter switch 162.

LCD 154 functions as an electronic view finder in the image taking mode. A display controller 152 is provided with a frame buffer for storing the digital image data of one screen, and a displaying circuit for driving LCD 154 based on the digital image data stored in the frame buffer. In the image taking mode, a work memory 148 is stored with a digital moving image expressing the object, a digital stationary image expressing a total or a portion of an image synthesized with the digital image expressing the object, α-channel information for synthesizing the two images, an object of constituting the menu and the like. The display circuit displayably synthesizes the images or the like to transfer to the frame buffer and displays the objects stored in the frame buffer on LCD 154.

CPU 142 controls a total of the digital camera 101 by executing a computer program stored in a flash memory 146 as the internal memory. The work memory 148 is a memory for temporarily storing a program or data. A program or various data stored in the flash memory 146 may be downloaded from a predetermined server via a network to store or may be inputted from a computer readable storage medium of a removable memory or the like to store.

Figure 4:
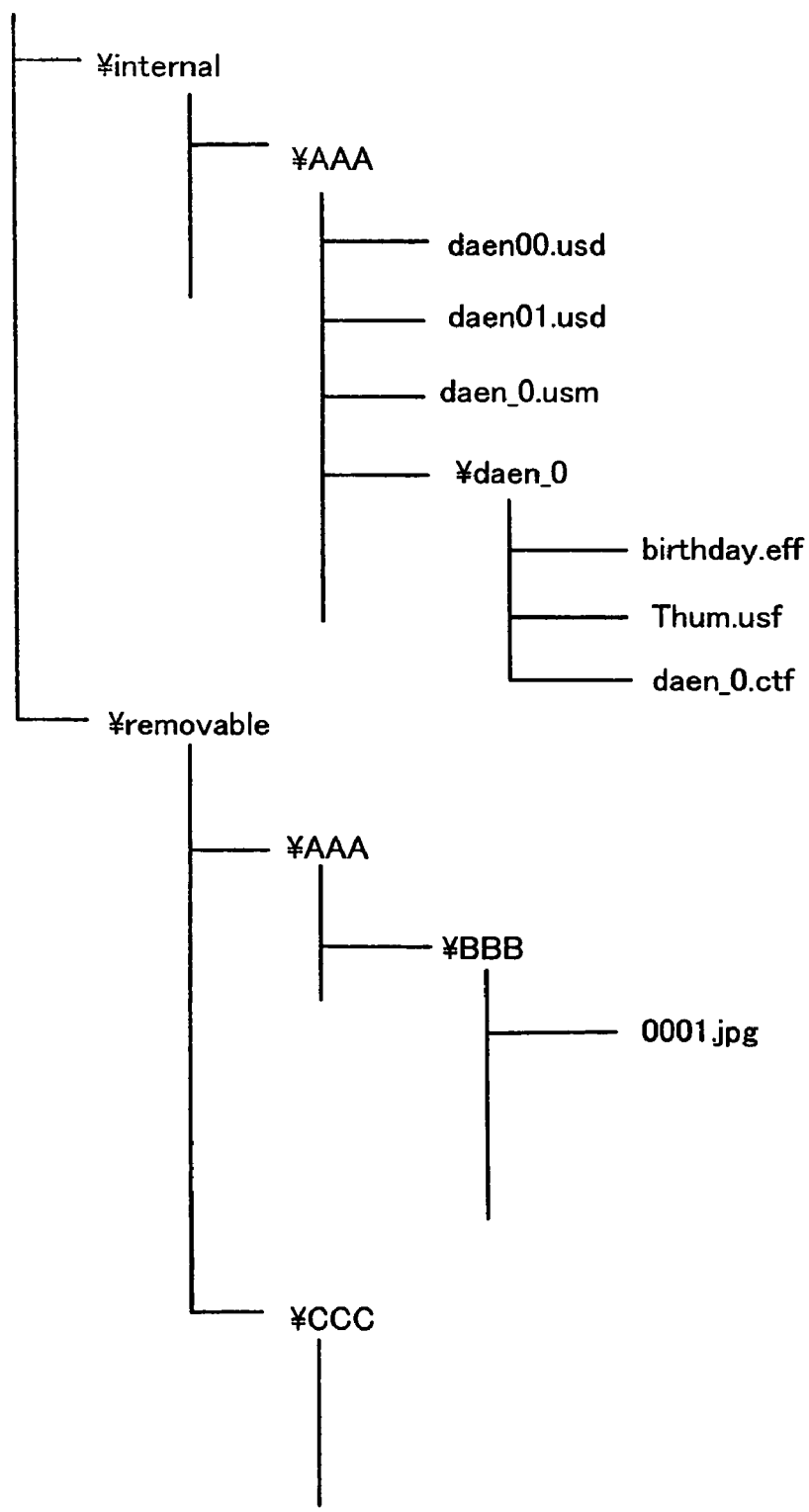
FIG. 4 is a schematic view according to the first embodiment.

FIG. 4 is a schematic view showing a directory of a file stored in the flash memory 146 and the removable memory 156. "¥internal" corresponds to a root directory of the flash memory 146 and "¥removable" corresponds to a root directory of the removable memory 156. Further, FIG. 4 shows a state in which an object image related to a layout defining file is not recorded at all.

A file having an extender of ".jpg" is a digital image (object image) expressing an object and is stored in the removable memory 156. By storing the object image to the removable memory 156, the object image can easily be transferred to a drawing apparatus of a printer or the like by constituting a medium by the removable memory 156.

A file having an extender of ".usd" is information defining a layout of an object image in drawing and an existing image synthesized with the object image in drawing (layout defining file) and is stored for each sheet size. The layout defining file will be described later in details.

A file having an extender of ".usm" is an index file. The index file is described with index information of a plurality of layout defining files having sheet sizes different from each other and brought in a relationship of being similar to each other. Specifically, for example, the index file is described with a number of the layout defining files brought into the relationship of being similar to each other, file names of the layout defining files brought into the relationship of being similar to each other and the like.

A file having an extender of ".eff" is a digital image (existing image) synthesized with the object image based on the layout defining file.

A file having an extender of ".usf" is a thumbnail for a drawing apparatus. The thumbnail for the drawing apparatus is a thumbnail image file for displaying a layout defined by the layout defining file on a monitor of the drawing apparatus of a printer, a personal computer or the like.

A file having an extender of ".ctf" is a thumbnail for the camera. The thumbnail for the camera is a thumbnail image file for displaying a layout defined by the layout defining file and an existing image on LCD 154 of the digital camera 101 as an image.

The thumbnail for the existing image, the drawing apparatus and the thumbnail for the camera are stored in a folder having a name the same as a file name of an index file described with a file name of a the layout defining file defining layouts displayed by the thumbnail for the drawing apparatus and the thumbnail for the camera. That is, the thumbnail for the camera and the index file are related to each other by the name of the folder stored with the thumbnail for the camera.

Figure 5:
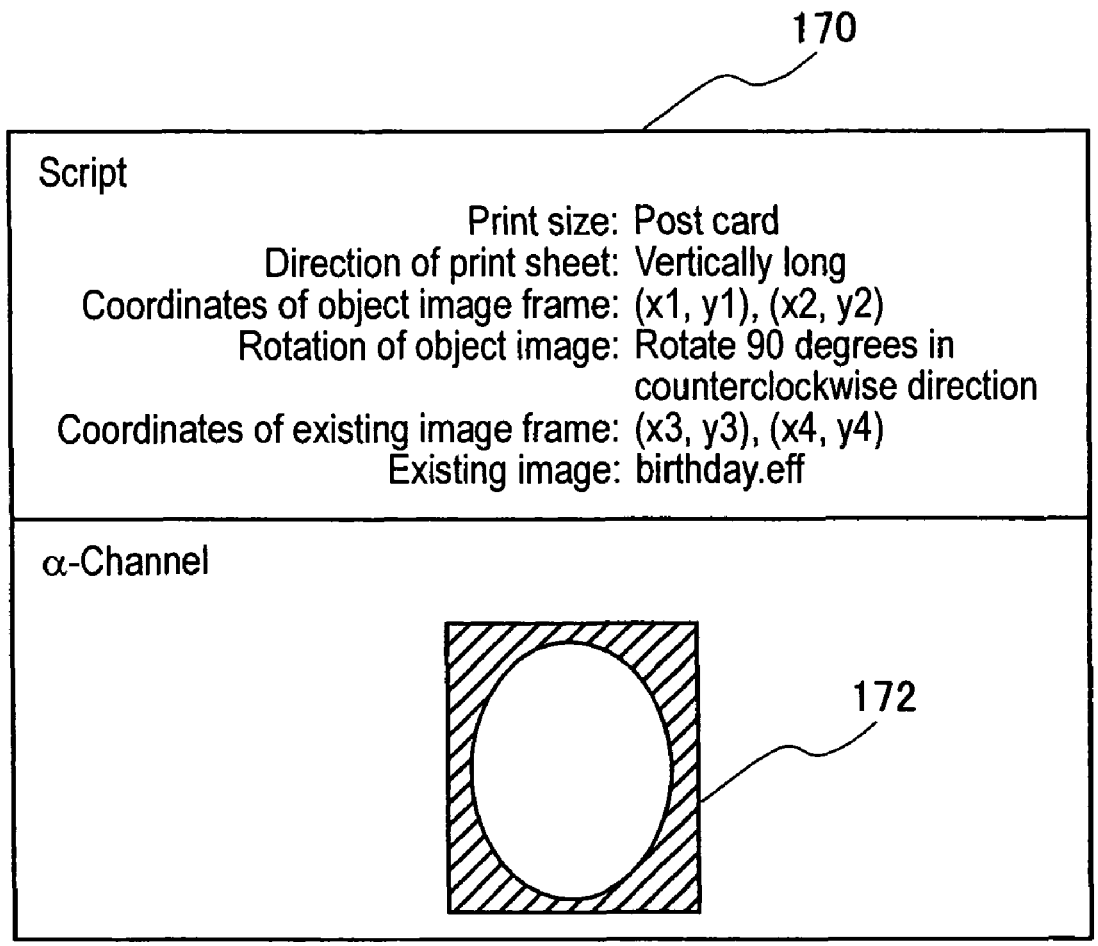
FIG. 5 is a schematic view according to the first embodiment.
Figure 6:
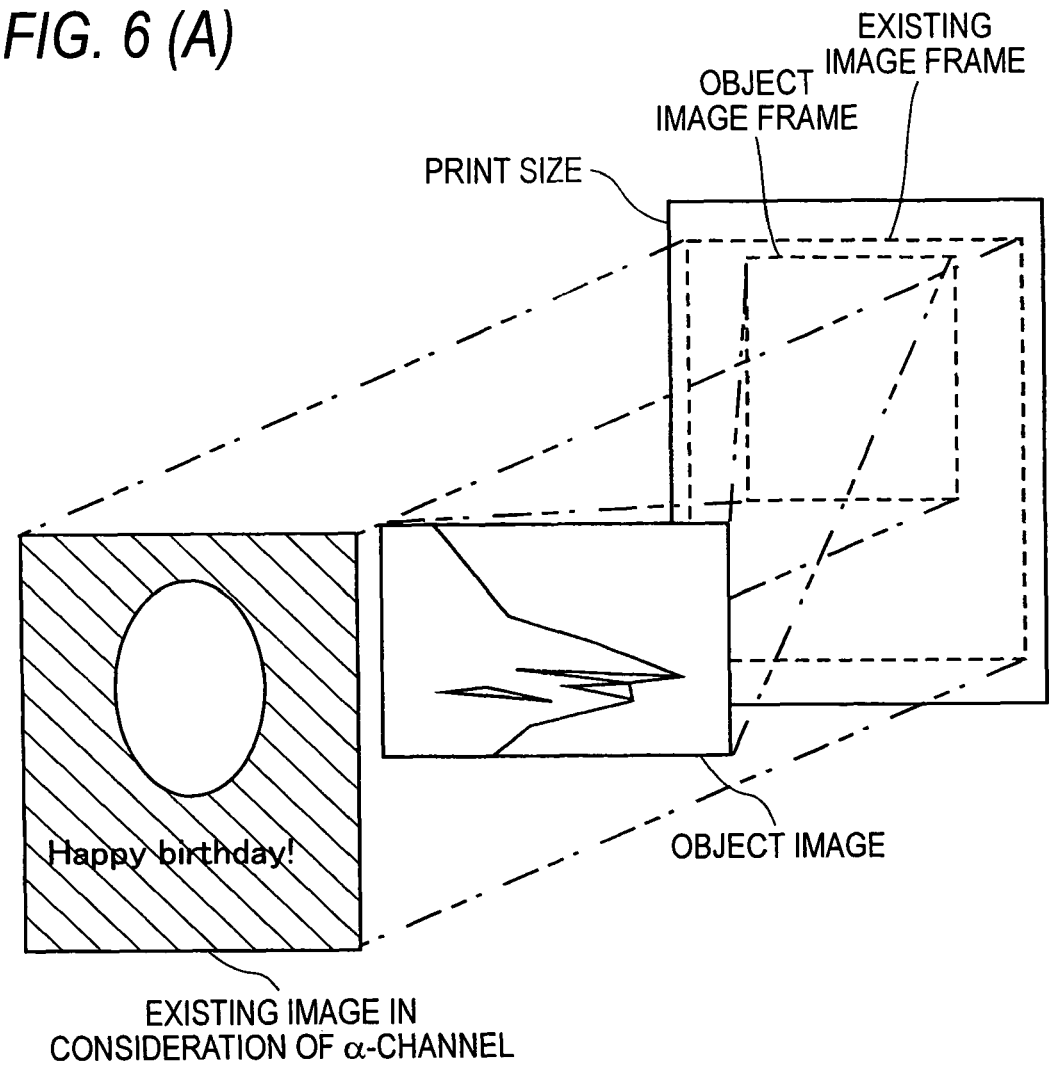
FIGS. 6(A) and 6(B) are schematic views according to the first embodiment.
Figure 6:
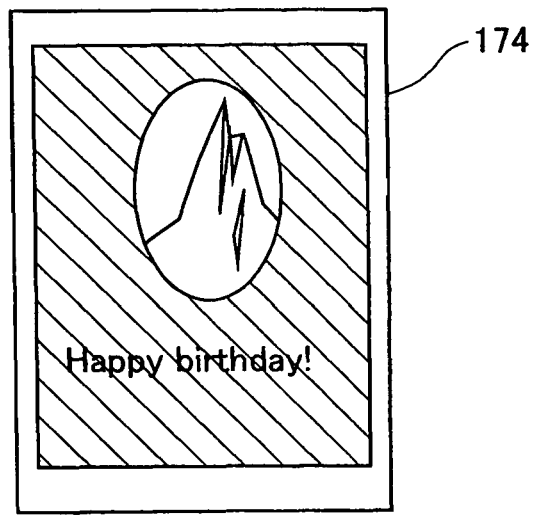

FIG. 5 is a schematic view showing a content of a layout defining file 170. FIG. 6(A) is a schematic view for explaining an image drawn by using the layout defining file 170. FIG. 6(B) is a plane view showing a postcard 174 printed by using the layout defining file 170. The layout defining file 170 is defined with a layout of an object image by script. The script defines position information for arranging the object image on a printing sheet, information for rotating the object image to arrange on the printing sheet, information for expanding or contracting the object image or the like uniquely interpretably by a printer or the like. Specifically, for example, a print size (for example, "postcard"), information of rectifying a direction of the print sheet (for example, "vertically long"), information for rectifying a frame of arranging the object image (object image frame) (for example, coordinates "(x1, y1)" of a left upper portion of the frame and coordinates "(x2, y2)") of a right lower portion of the frame, information for rectifying rotation in arranging the object image to the frame (for example, "rotate by 90 degrees in the counterclockwise direction") and the like are described at the layout defining file 170 by the script.

The layout defining file 170 may be described with information for specifying an image (existing image) synthesized with the object image (for example, "birthday.eff" as a file name of the existing image), information of rectifying a frame of arranging the existing image (for example, coordinates "(x3, y3)" of a left upper portion of the frame and coordinates "(x4, y4)" of a right lower portion of the frame, information for rectifying α-channel information (for example, a tag of α-channel information) and the like by the script. Further, the layout defining file 170 may be stored with α-channel information 172. The α-channel information is information in superposing to synthesize two images for defining which pixel of the image is reflected to the synthesized image for each pixel. Selection of the layout defining file 170 described with information for specifying the existing image by the script is equal to selection of the existing image.

Figure 7:
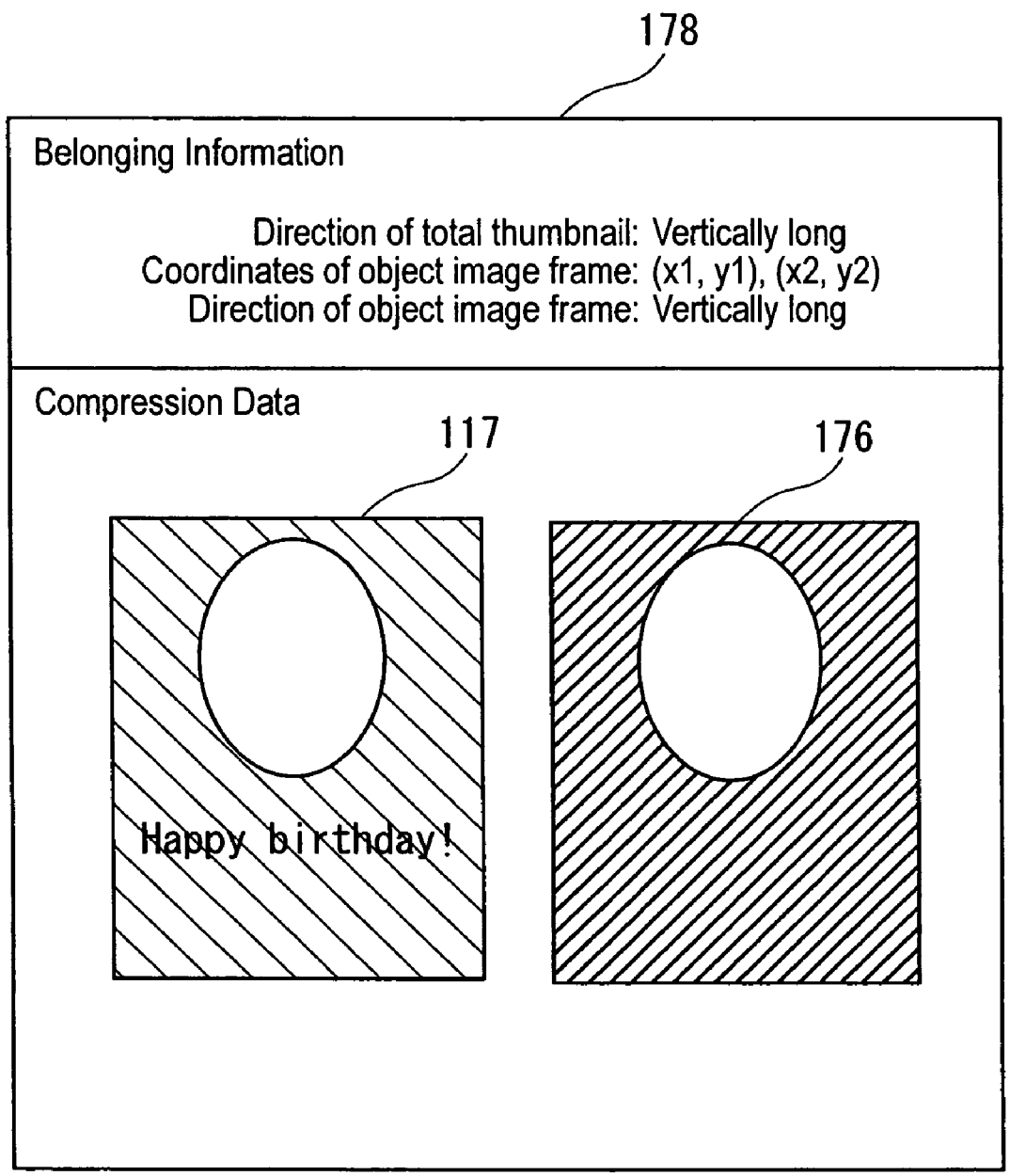
FIG. 7 is a schematic view according to the first embodiment.

FIG. 7 is a schematic view showing a content of a thumbnail 178 for the camera. The thumbnail 178 for the camera is stored with a digital stationary image (total thumbnail) 117 showing a total of a layout defined by the layout defining file 170. Further, the thumbnail 178 for the camera is stored with the total thumbnail 117 and α-channel information 176 for synthesizing the total thumbnail 117 and the object image to display. It is preferable that the total thumbnail 117 and the α-channel information 176 are compressed by a data style of JPEG or the like. Further, the thumbnail 178 for the camera is stored with information for rectifying a direction of the total thumbnail 117 (for example, "vertically long"), information for rectifying the frame for arranging the object image (coordinates "(x1, y1)" of a left upper portion of the frame and coordinates "(x2, y2)" of a right lower portion of the frame, information for rectifying a direction of the frame for arranging the object image (for example, "vertically long") and the like as information belonging thereto.

Here, an explanation will be given of a processing of inputting the layout defining file, the index file, the existing image, the thumbnail for the drawing apparatus and the thumbnail for the camera from the removable memory 156. Hereinafter, the five kinds of files are summarized to refer to as a layout file set. When a predetermined program stored in the flash member 146 is executed by CPU 142 by selecting a predetermined item of a predetermined menu by a user, a processing of inputting the layout file set from the removable memory 156 is started. That is, CPU 142 functions as an inputting unit by executing the predetermined program stored in the flash memory 146.

Figure 8:
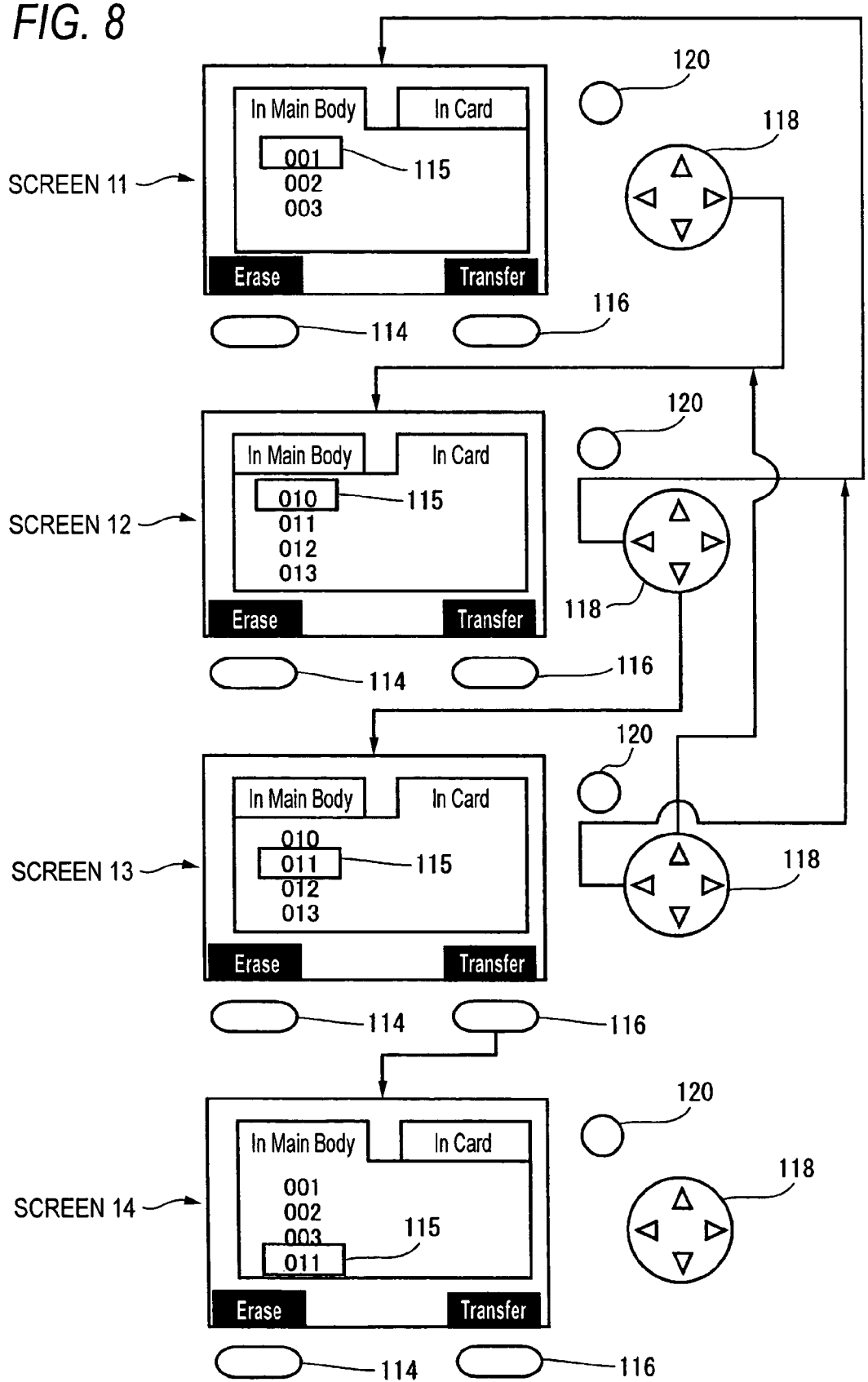
FIG. 8 is a schematic view according to the first embodiment.

FIG. 8 is a schematic view for explaining HMI (Human Machine Interface) for inputting the layout file set from the removable memory 156, showing a transition of a screen of LCD 154. First, a menu of the layout file set stored in the flash memory 146 is displayed on LCD 154 as in, for example, a screen 11. The menu displays an identifier of all of the layout file set stored in the flash memory 146 (specifically, for example, a file name of an index file) as an item selectable by operating the cross key 118.

When a right end of the cross key 118 is pushed in a state of displaying the screen 11, the menu of the layout file set stored in the removable memory 156 is displayed on LD 154 as in, for example, a screen 12. The menu displays the identifier of all of the layout file set stored in the removable memory 156 (specifically, for example, the file name of the index file) as the item selectable by operating the cross key 118.

When a lower end or an upper end of the cross key 118 is pushed in a state of displaying a screen 12, 13, an item successive to an item which is currently being selected is selected. Further, the item which is being selected currently is shown to a user by a cursor 115. Further, it is preferable to display a content of a file set which is being selected currently by the thumbnail for the camera.

When the push button 116 is pushed in the state of displaying the screen 12, 13, the layout file set which is being selected currently is copied to the flash memory 146. When the copy is finished, in order to inform finishing the copy to a user, the menu of the layout file set stored in the flash memory 146 is displayed as in, for example, a screen 14.

Figure 1:
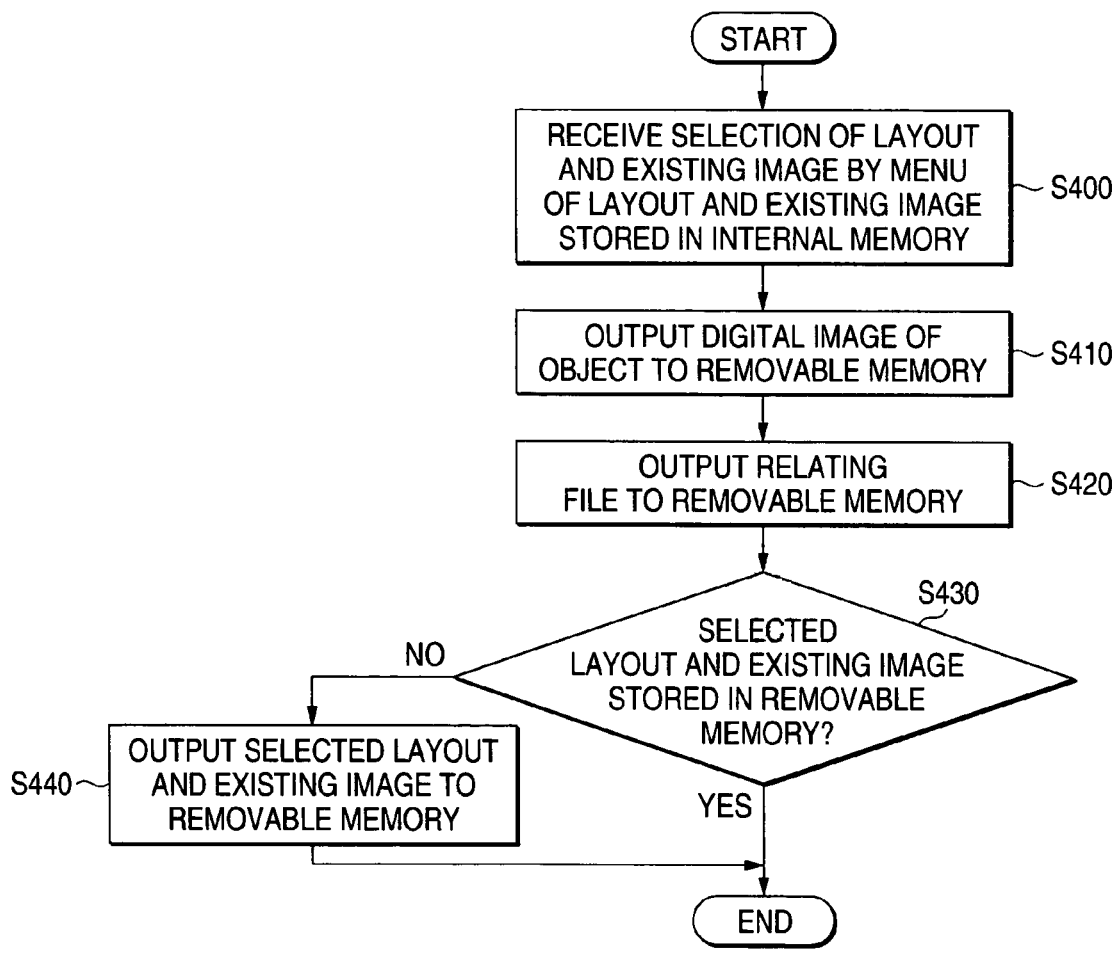
FIG. 1 is a flowchart according to a first embodiment.
Figure 9:
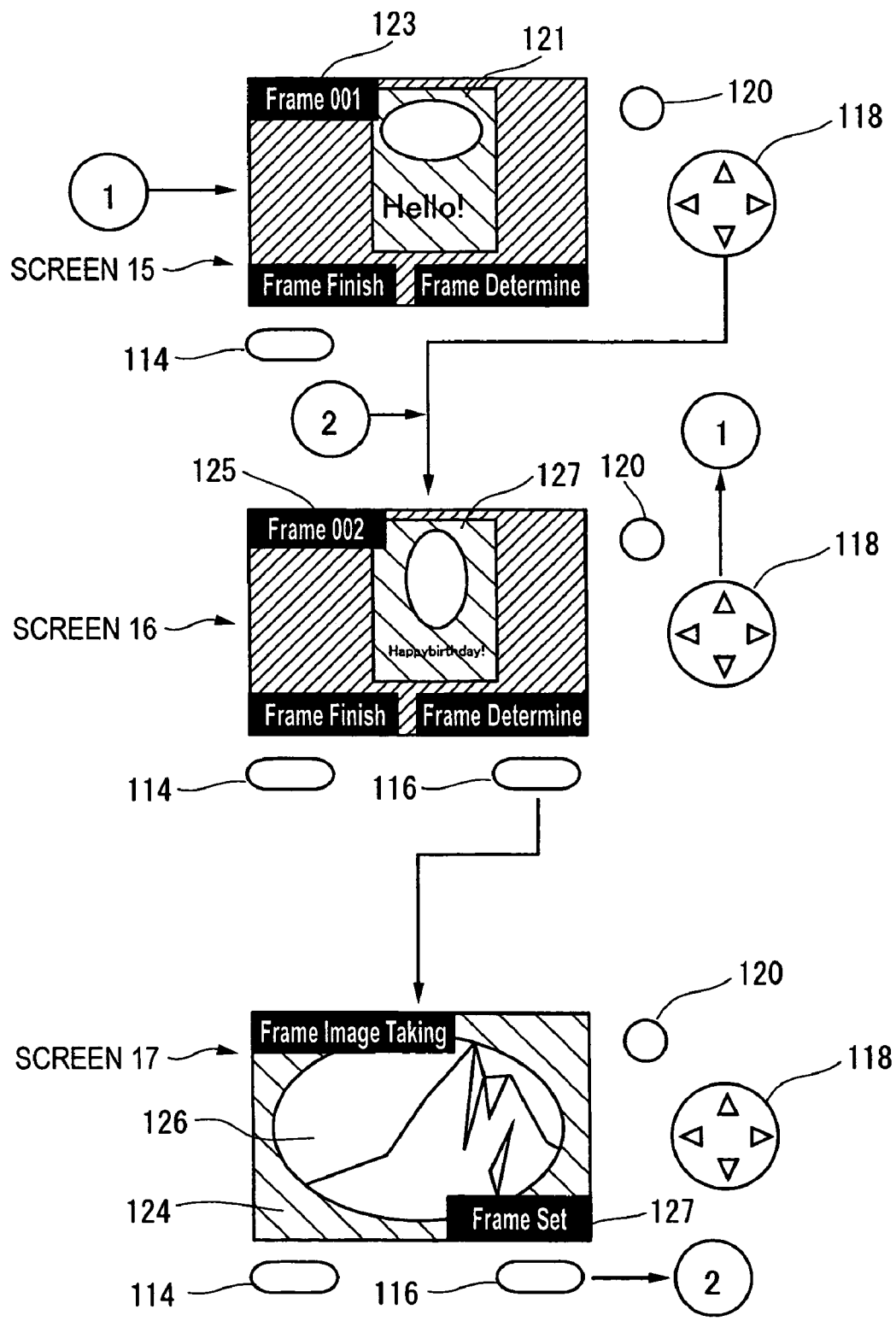
FIG. 9 is a schematic view according to the first embodiment.

FIG. 1 is a flowchart showing a flow of processings of relating an object image in the image taking mode of the digital camera according to the first embodiment of the invention to the layout and existing image to output to the removable memory. FIG. 9 is a schematic view for explaining HMI for the processing showing a transition of the screen of LCD 154. The processing shown in FIG. 1 is started when the push button switch 120 and the push button switch 116 are successively pushed in the image taking mode, and is made to proceed by executing a predetermined program stored in the flash memory 146 by CPU 142. That is, CPU 142 functions as a selection receiving unit, an object image outputting unit, an existing image outputting unit and a layout outputting unit by executing the predetermined program stored in the flash memory 146.

At S400, selection of the layout and existing image is received by the menu of the layout file set stored in the flash memory 146 as an internal memory. Specifically, selection of the layout and existing image is received, for example, specifically as follows. When the push button switch 120 and the push button switch 116 are successively pushed in the image taking mode, as shown by a screen 15, an identifier 123 of the layout file set which is being selected currently and an image 121 showing a content of the layout defining file based on the thumbnail for the camera are displayed on LCD 154. When the upper end or the lower end of the cross key 118 is pushed in the state of displaying the screen 15, an identifier 125 of a successive layout file set and an image 127 showing a content of the layout defining file are displayed on LCD 154 as in, for example, a screen 16. When the push button switch 116 is pushed in a state of displaying the identifier 123, 125 of the layout file set which is being selected and the image 121, 127 showing the content of the layout defining file as in the screen 15 or the screen 16, the operation returns to the image taking mode and an image 124 showing a portion of the content of the layout defining file and an object moving image 126 and a menu 127 are synthesized to display as in a screen 17. The object moving image 116 is constituted by object images outputted from the image forming portion 136 at predetermined time intervals.

A processing of S410 is started when the shutter switch 162 is pushed in the image taking mode of selecting the layout file set. At S410, the object image outputted from the image forming portion 136 and compressed by the compressing/decompressing portion 138 is stored in the removable memory 156 by the input/output portion 150.

At S420, a relating file describing the file name of the index file of the layout file set which is being selected currently is stored in a folder the same as that of the object image. As a result, the object image is stored in the removable memory 156 by being related to the layout file set which is being selected currently. The relating file is described with the file name of the index file and is attached with a file name the same as the file name of the object image intended to relate to the layout defining file described in the index file. That is, the object image and the relating file are related to each other by the file names of the object image and the relating file. The relating file and the index file are related to each other by the file name described in the relating file. The index file and the layout defining file are related to each other by the file name of the layout defining file described in the index file. By relating by the plurality of files, a plurality of layout defining files having different sheet sizes and brought in a relationship of being similar to each other are related to the single object image.

At S430, it is determined whether the file set which is being selected currently is stored in the removable memory 156. When the file set which is being selected currently has already been stored in the removable memory 156, the processing of recording the object image by relating the object image to the layout file set is finished. When the file set which is being selected currently is not stored in the removable memory, the operation proceeds to S440 and stores the file set which is being selected to the removable memory 156.

Figure 10:
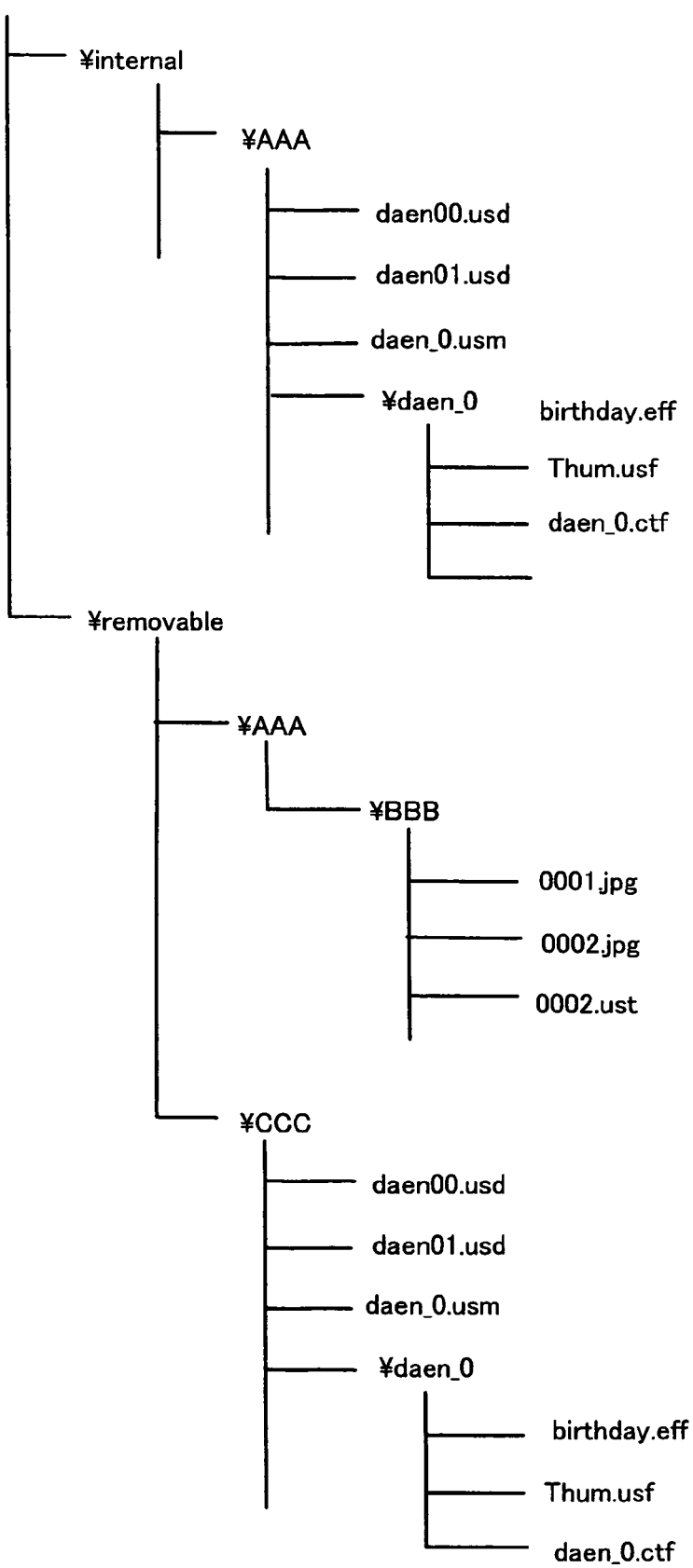
FIG. 10 is a schematic view according to the first embodiment.

FIG. 10 is a schematic view showing a directory of files stored in the flash memory 146 and the removable memory 156. FIG. 10 shows files immediately after pushing the shutter switch 162 after selecting the file set stored in the flash memory 146 is selected in a state of storing the file shown in FIG. 4 in the flash memory 146 and the removable memory 156. A file having an extender of ".ust" is the above-described relating file. For example, the relating file of "0002.ust" is described with a file name of "daen_0.usm".

According to the first embodiment of the invention, the layout file set stored in the flash memory 146 as the internal memory is selected by a user and therefore, there is not brought about a drawback that the layout file set which has been selected before interchanging the removable memory 156 cannot be selected after interchanging. Further, the layout file set stored in the removable memory 156 can be inputted and therefore, a user can select a variety of layout file sets. Further, the object image is outputted to the removable memory 156 by being related to the selected layout file set and therefore, the object image can be recorded drawably by the selected layout file set. Further, the digital image and the layout of the object are outputted to the removable memory 156 by being related to each other and therefore, in a drawing apparatus of a printer or the like, the object image can firmly be drawn in accordance with the selected file set.

Further, according to the first embodiment of the invention, the selected layout file set is outputted to the removable memory 156 after outputting the object image related to the layout file set to the removable memory 156 and therefore, the selected layout file set can firmly be outputted to the removable memory 156 without waste.

Further, according to the first embodiment of the invention, the layout file set stored in the removable memory 156 is not duplicatedly outputted to the removable memory 156 and therefore, waste of a storing region of the removable memory 156 can be prevented.

Second Embodiment

Figure 11:
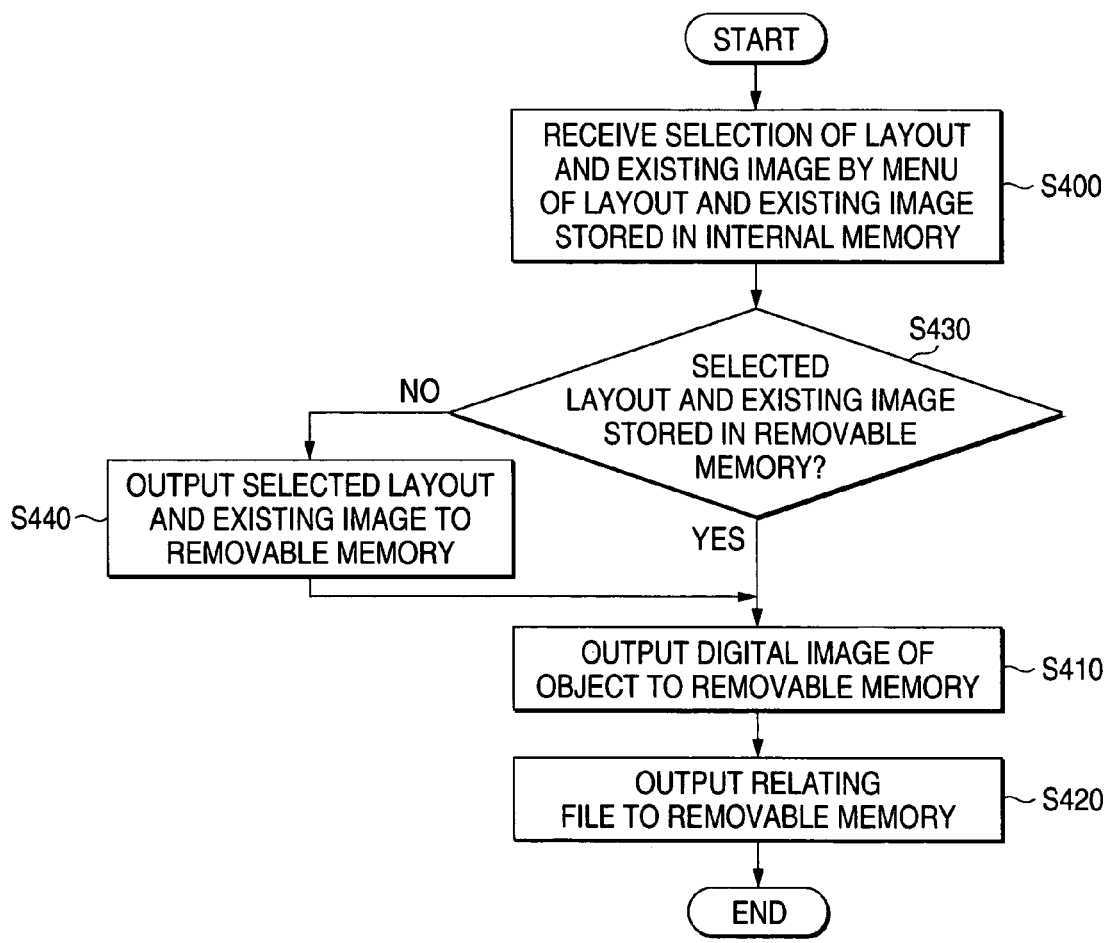
FIG. 11 is a flowchart according to a second embodiment.

FIG. 11 is a flowchart showing a flow of processings of relating the object image of the layout and the existing image to output to the removable memory in the image taking mode of the digital camera according to a second embodiment of the invention. Steps of executing processings described above are attached with notations described above. According to the second embodiment of the invention, a timing of outputting the layout file set to the removable memory 156 is immediately after selecting the layout file set by the user, that is, immediately before outputting the object image. The second embodiment of the invention is substantially the same as the first embodiment in other respect.

According to the second embodiment of the invention, the layout file set can be outputted to the removable memory 156 before pushing the shutter switch 162 and therefore, processings necessary after pushing the shutter switch 162 can be reduced. Therefore, in comparison with the first embodiment, an interval of continuously recording the object image can be shortened.

Third Embodiment

Figure 12:
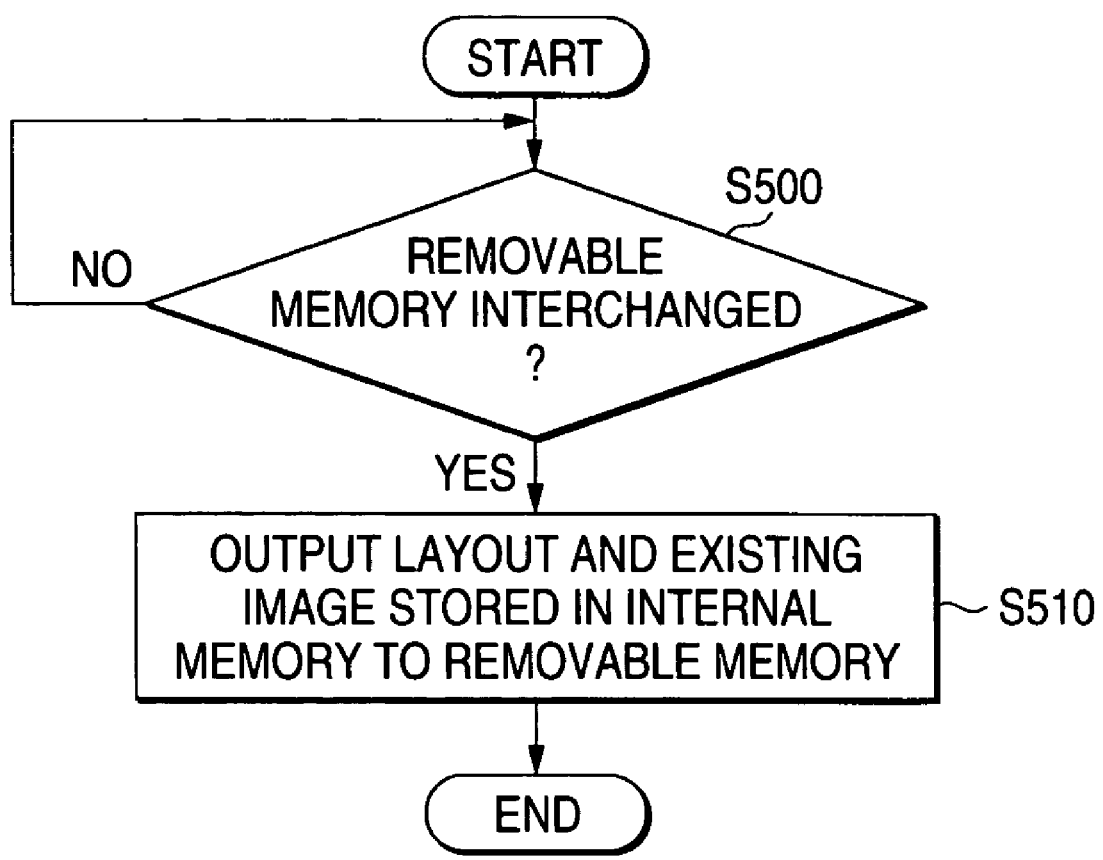
FIG. 12 is a flowchart according to a third embodiment.
Figure 13:
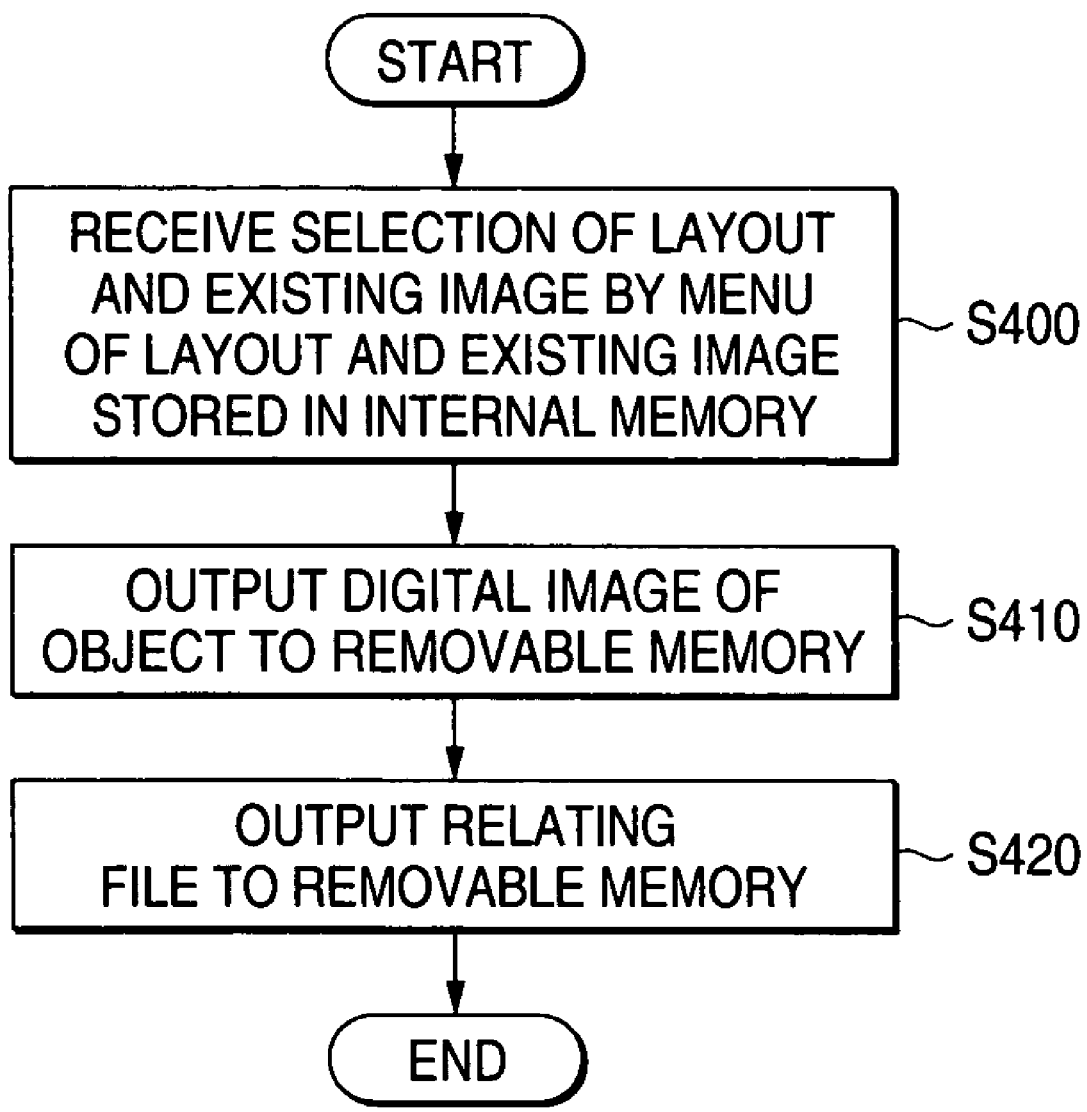
FIG. 13 is a flowchart according to the third embodiment.

FIG. 12 is a flowchart showing a flow of processings of inputting the layout file set to the digital camera according to a third embodiment of the invention. FIG. 13 is a flowchart showing a flow of processings of relating the object image to the layout and the existing image to output to the removable memory in the image taking mode of the digital camera according to the third embodiment of the invention. Steps executing processings described above are attached with notations described above. According to the third embodiment of the invention, the timing of outputting the layout file set to the removable memory 156 is immediately after interchanging the removable memory 156 by the user. The third embodiment of the invention is substantially the same as the first embodiment in other respect.

At S500, it is determined whether the removable memory 156 is interchanged at predetermined time intervals. When the removable memory 156 is interchanged, the operation proceeds to S510, and all of the layout file set which is stored in the flash memory 146 and which is not stored in the removable memory is outputted to the removable memory 156.

According to the third embodiment of the invention, the layout file set can be outputted to the removable memory 156 before pushing the shutter switch 162 and therefore, processings necessary after pushing the shutter switch 162 can be reduced. Therefore, in comparison with the first embodiment, an interval of continuously recording the object image can be shortened.

Fourth Embodiment

Figure 14:
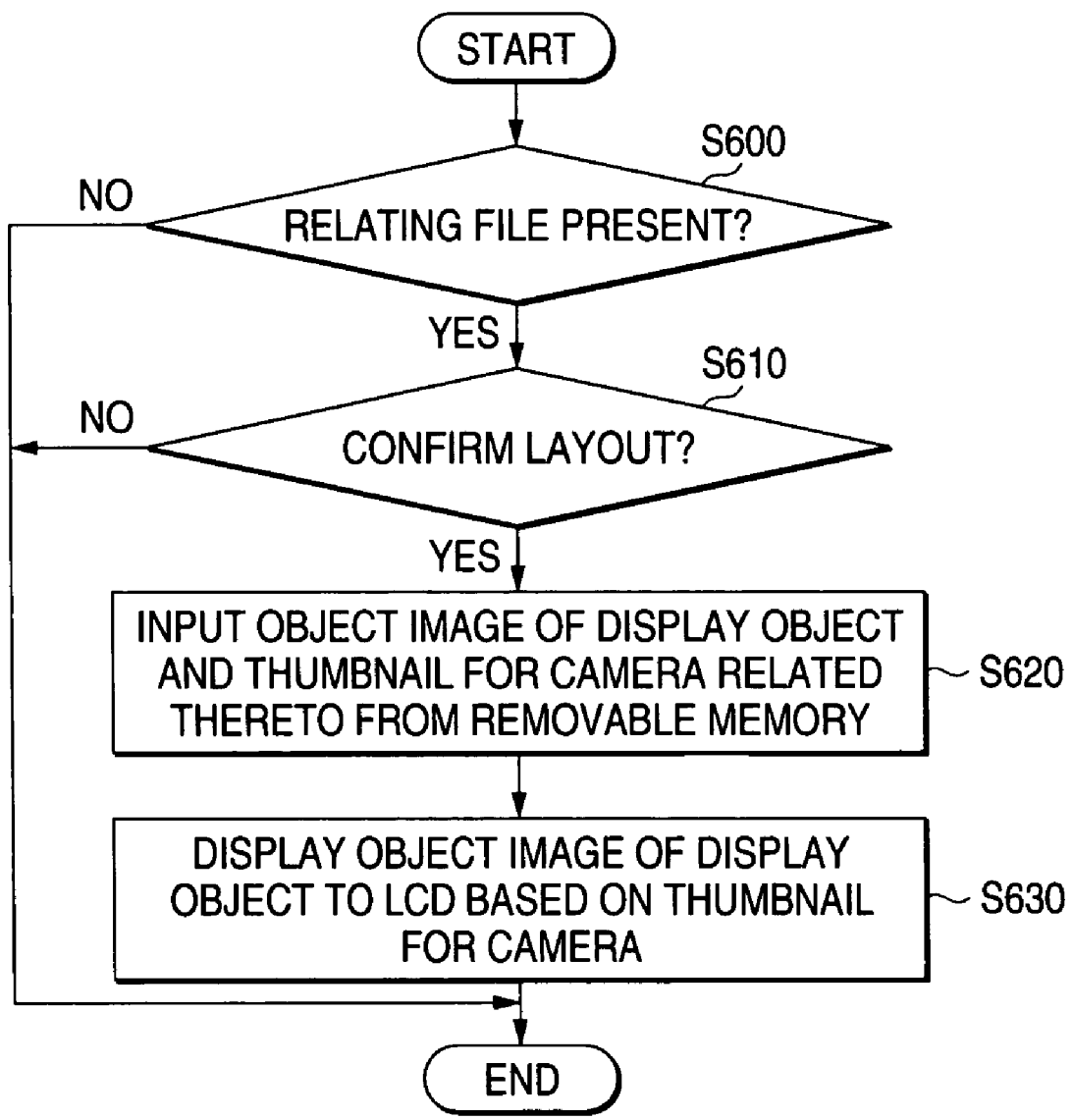
FIG. 14 is a flowchart according to a fourth embodiment.

FIG. 14 is a flowchart showing a flow of processings of displaying the object image stored in the removable memory 156 to be related to the layout file set on LCD 154. The processings shown in FIG. 14 are started when the image reproducing mode is selected by the dial switch 160 and a user selects the object image constituting an object of display by the cross key 118 and the like, and made to proceed by executing a predetermined program stored in the flash memory 146 by CPU 142. That is, CPU 142 functions as a drawing controlling unit that controls LCD 154 by executing the predetermined programs stored in the flash memory 146.

At S600, presence or absence of the relating file for relating the object image constituting the object of display and the file set is determined. Specifically, the determination is executed by searching for the related file attached with a file name the same as that of the object image constituting the object of display. When the related file is present, the operation proceeds to S610 and when the related file is absent, the processings shown in FIG. 14 are finished.

At S610, whether the layout in printing is confirmed with regard to the object image constituting the object of display is asked to the user. Specifically, a message of the asking is displayed at a vicinity of the push button switch 116, when the push button switch 116 is pushed, the operation proceeds to S620 and when the push button switch 116 is not pushed, the processings shown in FIG. 14 are finished.

At S620, the object image constituting the object of display, and a total thumbnail and α-channel information of the thumbnail for the camera of the file set related thereto are inputted from the removable memory 156 and are compressed by the compressing/decompressing portion 138. At this occasion, an original image of the object image may be inputted or a thumbnail image of the object image may be inputted.

Figure 15:
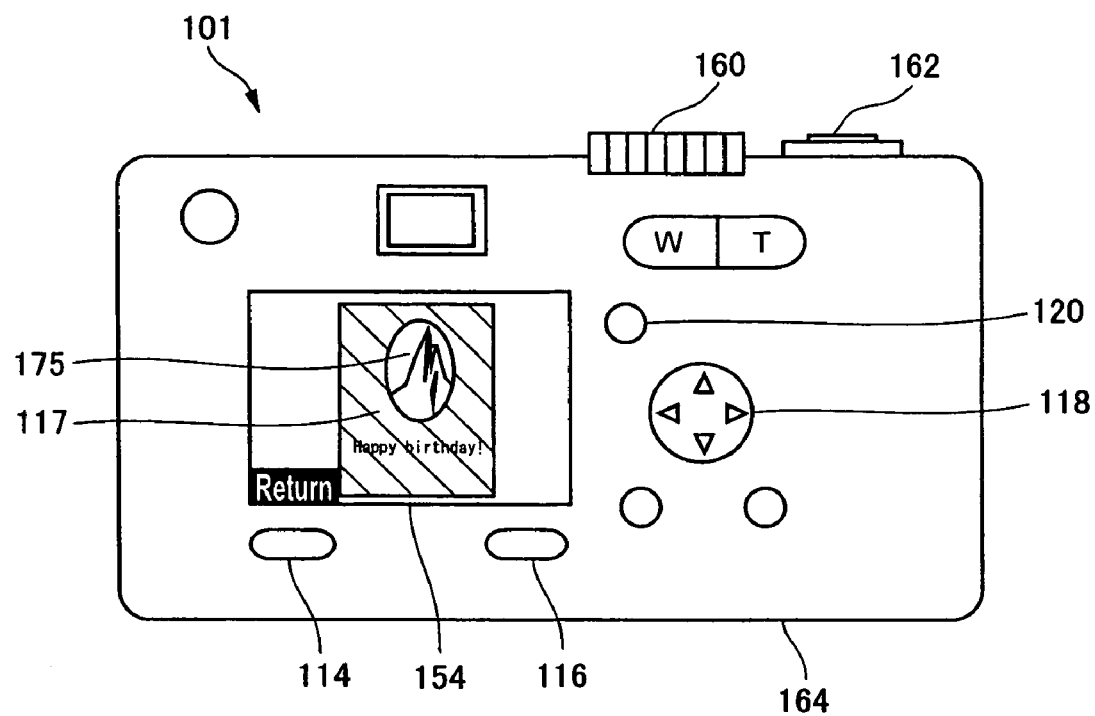
FIG. 15 is a front view according to the fourth embodiment.

At S630, the object image constituting the object of display, a total thumbnail and the α-channel information are stored in the frame buffer of the display controller 152 and an object image 175 and a total thumbnail 117 are synthesized to display as shown by FIG. 15. An arrangement of the object image 175 on the screen is determined by the coordinates of the object image frame defined by information belonging to the thumbnail for the camera. Further, when the existing image is not defined in the layout defining file related to the object image constituting the object of display, a rectangular shape of a solid matrix simulating a blank sheet is displayed as the total thumbnail, and the object image is displayed in the object image frame defined by information belonging to the thumbnail for the camera. That is, regardless of defining or not defining the existing image in the layout defining file, the arrangement of the object image on the screen is determined based on the object image frame of information belonging to the thumbnail for the camera previously defined in accordance with the object image frame of the layout defining file. Further, when the existing image is defined in the layout defining file, instead of synthesizing the existing image per se and the object image to display, the total thumbnail in correspondence with the thumbnail image of the existing image is synthesized with the object image to display. Further, instead of displaying the object image by using the thumbnail for the camera, the arrangement of the object image on the screen may be specified by interpreting the content of the layout defining file, the existing image may be enlarged or contracted in accordance with a display region of LCD 154 and synthesized with the object image to display.

Figure 16:
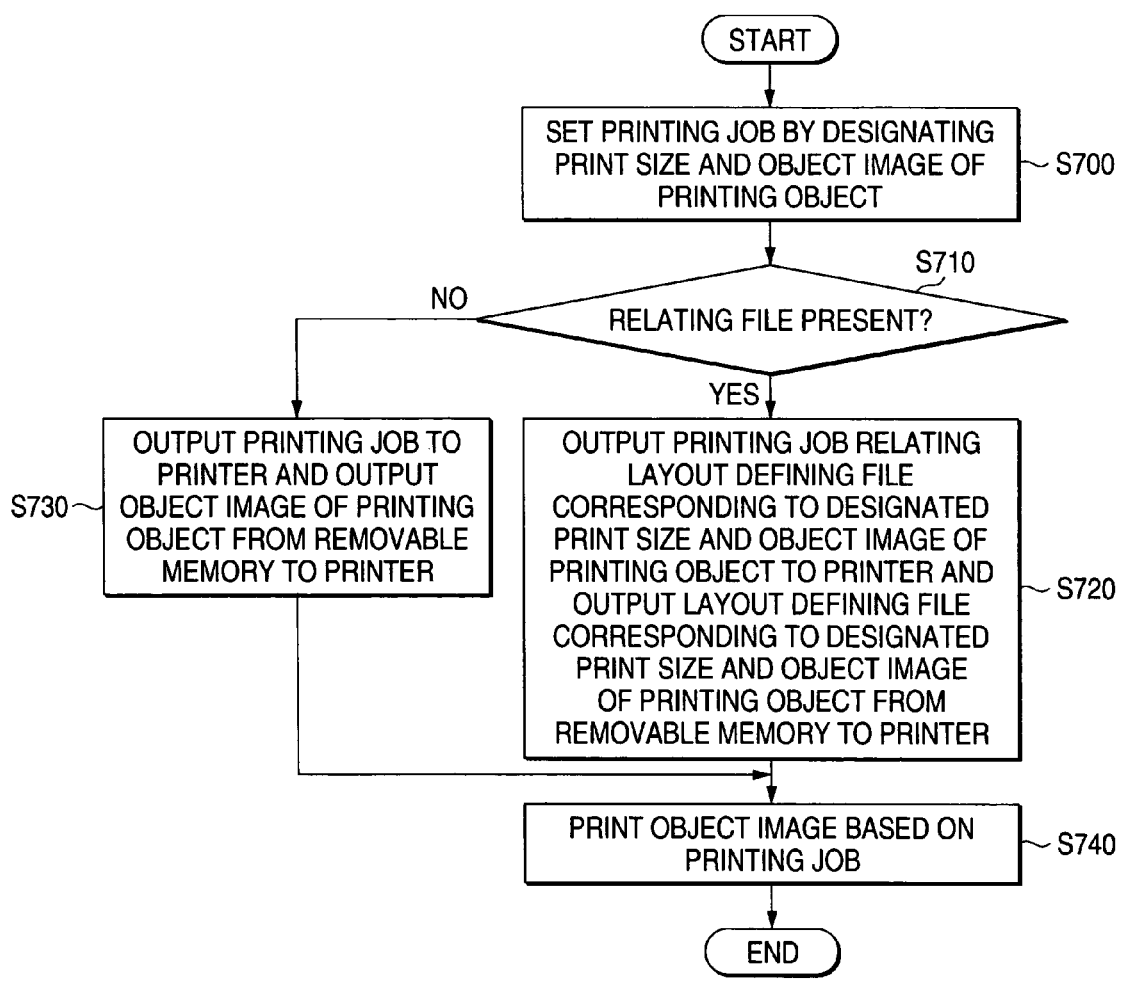
FIG. 16 is a flowchart according to the fourth embodiment.

FIG. 16 is a flowchart showing a flow of processings of causing a printer, not illustrated, to print the object image stored in the removable memory 156 to be related to the layout file set. The processings shown in FIG. 16 are started when the direct print mode is selected by the dial switch 160 and is made to proceed by executing a predetermined program stored in the flash memory 146 by CPU 142. That is, CPU 142 functions as a drawing controlling unit that controls a printer by executing the predetermined program stored in the flash memory 146.

At S700, a menu for designating a sheet size and the object image constituting an object of printing, the sheet size and the object image constituting the object of printing are designated by the user, and a printing job in accordance with a designated content is set.

At S710, presence or absence of the relating file for relating the object image constituting the object of printing and the file set is determined. Specifically, the determination is executed by searching for the related file attached with the file name the same as that of the object image constituting the object of printing. When the related file is present, the operation proceeds to S720 and when the related file is absent, the operation proceeds to S730.

At S720, the printing job is outputted to the printer communicatably connected the digital camera 101, and a layout defining file in accordance with the sheet size designated by the user and the object image constituting the object of printing are outputted from the removable memory 156 to the printer. The layout defining file in accordance with the sheet size is outputted to the printer, for example, as follows. The file name of the layout defining file in accordance with the designated sheet size is specified in the layout defining files already described in the index file in reference to the index file of the file set related to the object image constituting the object of printing. The layout defining file the file name of which is specified is read from the removable memory 156 to output to the printer. Further, when the existing image is defined in the layout defining file, also the existing file is read from the removable memory 156 and is outputted to the printer along with the layout defining file.

At S730, since the layout file set is not related to the object image constituting the object of printing, the printing job is outputted to the printer communicatably connected to the digital camera 101 and the object image constituting the object of printing is outputted from the removable memory 156 to the printer.

At S740, the printing job is interpreted under control of CPU mounted to the printer and the object image is printed based on the printing job. That is, when the layout defining file and the object image are related to each other in the printing job, the object image is arranged based on the layout defining file inputted to the printer along with the object image. Further, when the existing image is defined in the layout defining file, the object image and the existing image are synthesized. Further, instead of causing the printer to print the object image by interpreting the printing job and the layout defining file, the printing job and the layout defining file may be interpreted in the digital camera 101, the object image may be converted into printing data in the digital camera 101 and printing data may be outputted from the digital camera 101.

The fourth embodiment of the invention is substantially the same as the first embodiment in other respect. According to the fourth embodiment of the invention, the layout file set stored in the flash memory 146 as the internal memory is selected by the user and therefore, there is not brought about a drawback that the layout file set selected before interchanging the removable memory 156 cannot be selected after the interchange. Further, since the layout file set stored in the removable memory 156 can be inputted, the user can select a variety of layout file sets. Further, since the object image is outputted to the removable memory 156 by being related to the selected layout file set, the object image can drawably be recorded by the selected layout file set. Further, the digital image and the layout of the object are outputted to the removable memory 156 by being related to each other and therefore, the object image can firmly be drawn in accordance with the selected file set in the drawing apparatus of a display, a printer or the like.

Fifth Embodiment

According to a fifth embodiment, the input/output portion 150 and the removable memory 156 are used "an external storing unit" described in the scopes of claims.

Figure 17:
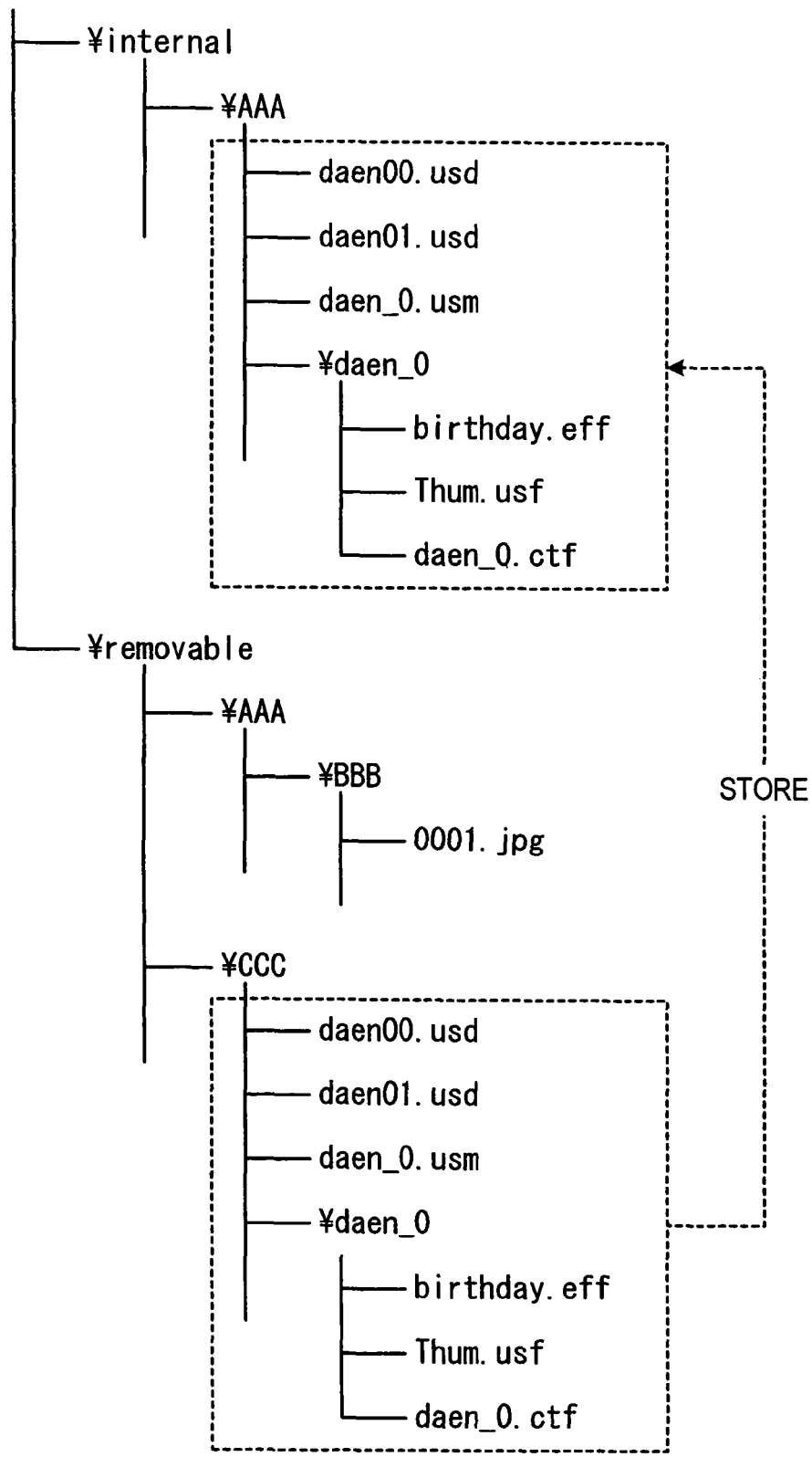
FIG. 17 is a schematic view showing a layout and an existing image according to a fifth embodiment.

FIG. 17 is a schematic view showing files stored in the flash memory 146 and the removable memory 156 along with a directory structure. Further, FIG. 17 shows a state immediately after storing the layout defining file stored in the removable memory 156 to the flash memory 146 and showing a state in which the object image related to the layout defining file is not recorded at all.

Figure 18:
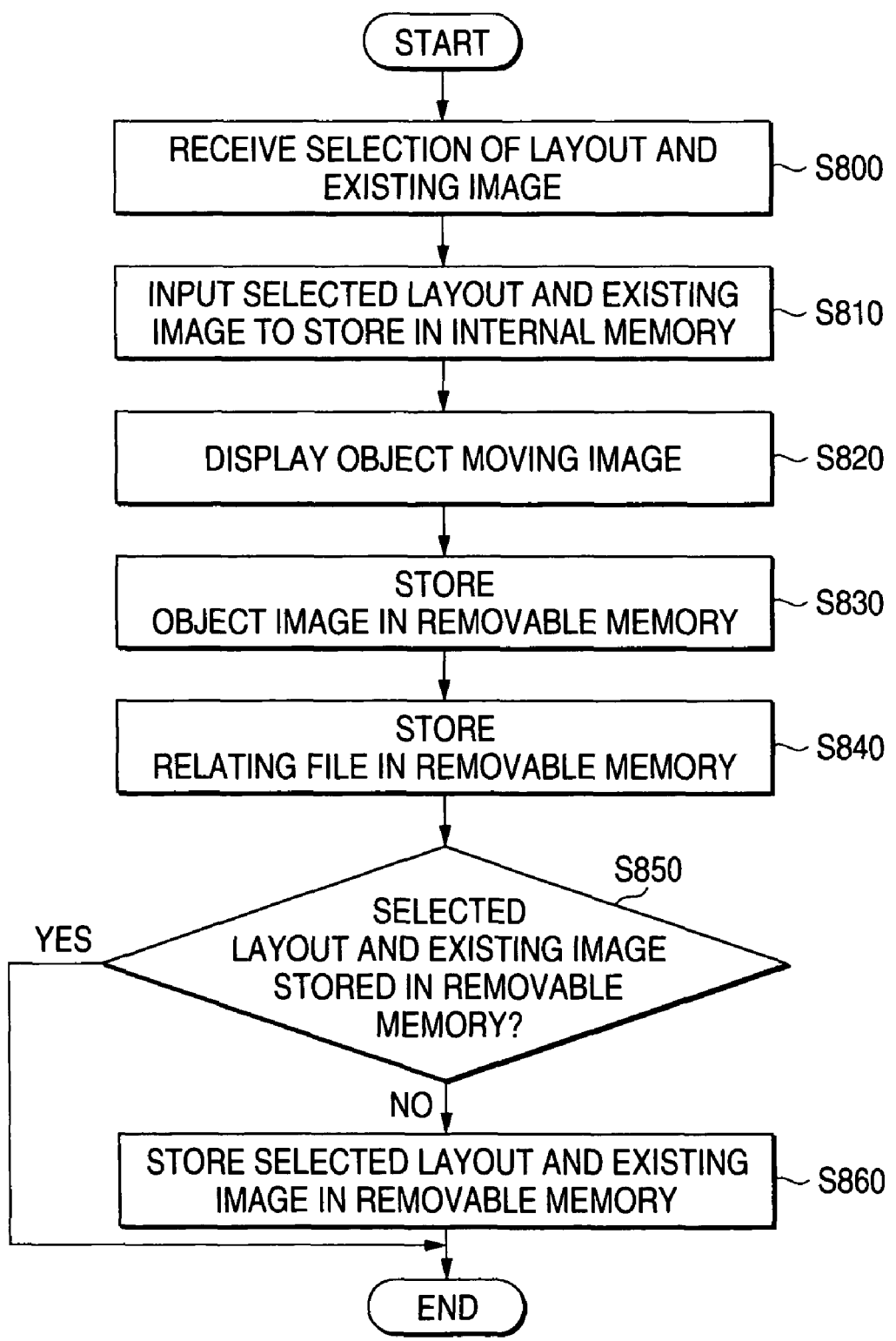
FIG. 18 is a flowchart according to the fifth embodiment.
Figure 19:
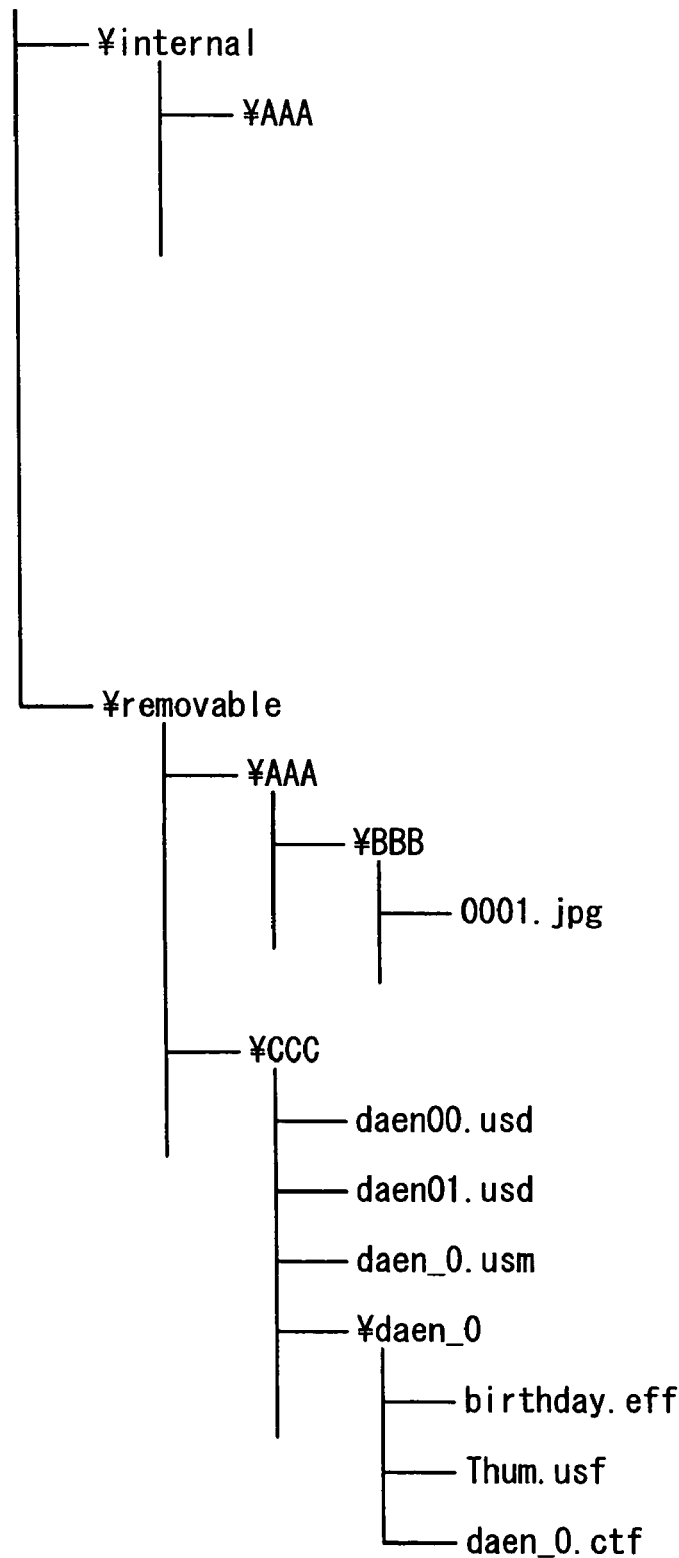
FIG. 19 is a schematic view showing a layout and an existing image according to the fifth embodiment.
Figure 20:
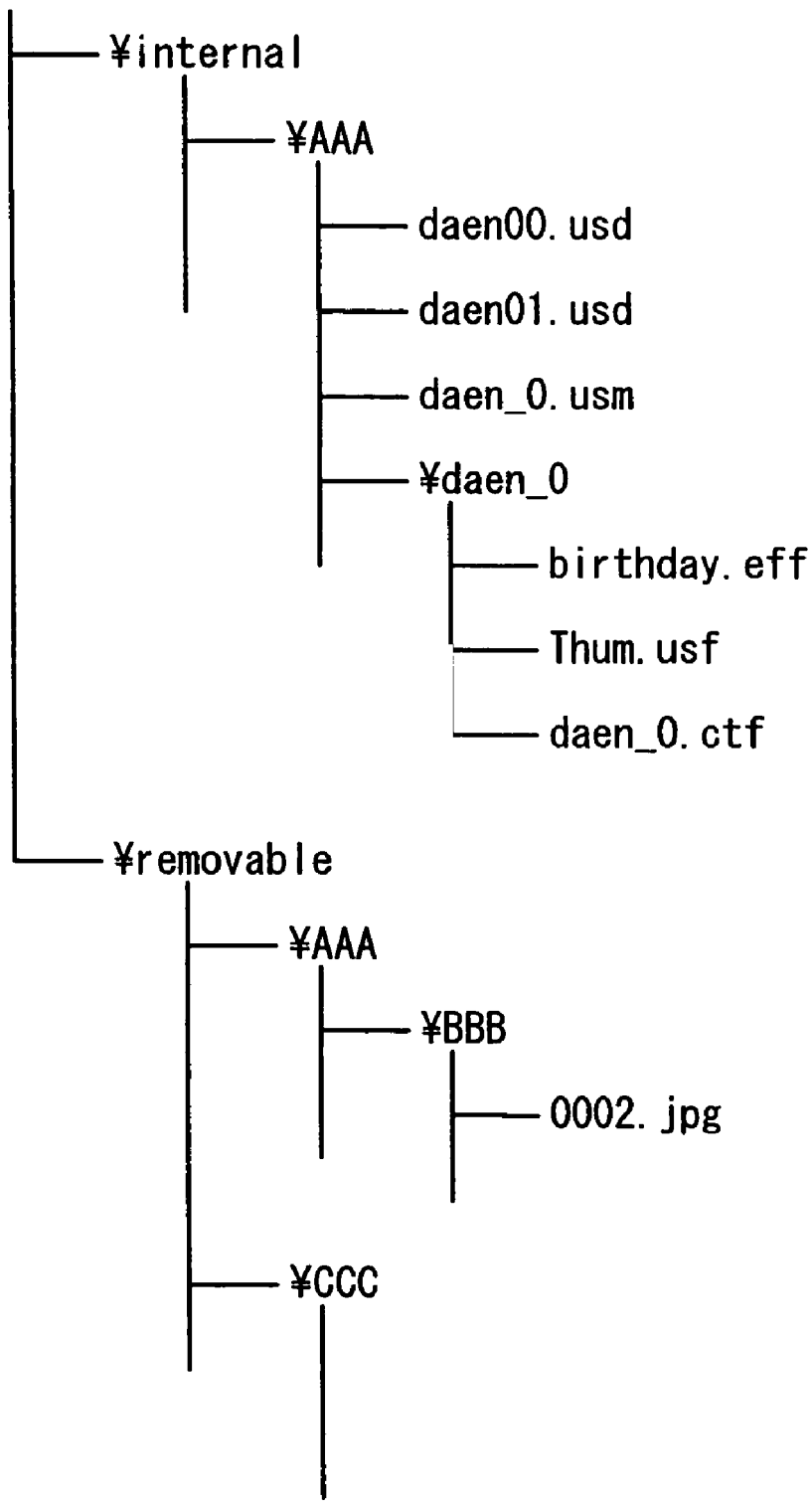
FIG. 20 is a schematic view showing a layout and an existing image according to the fifth embodiment.
Figure 21:
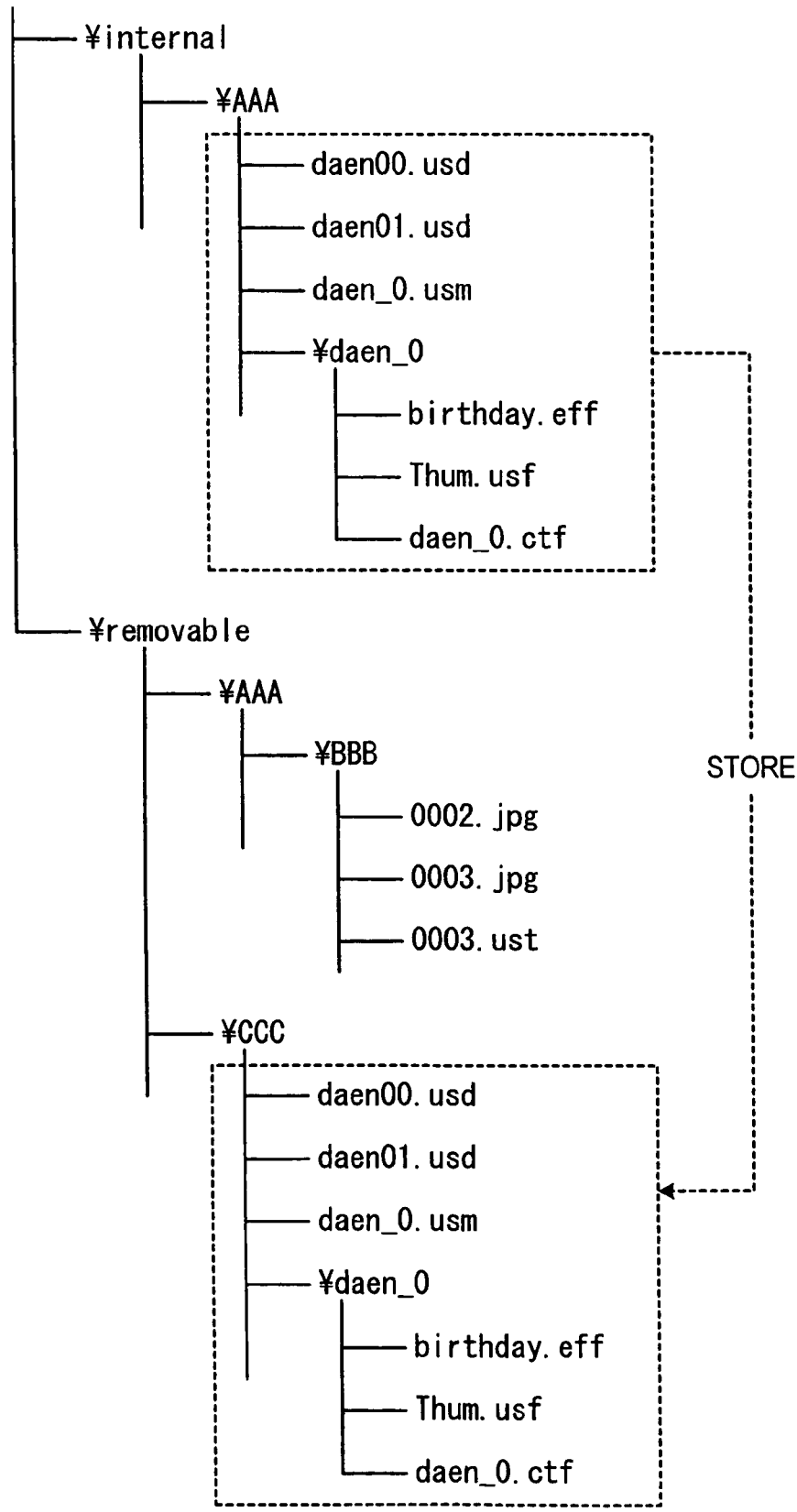
FIG. 21 is a schematic view showing a layout and an existing image according to the fifth embodiment.

FIG. 18 is a flowchart showing a flow of processings after receiving selection of the layout until storing the layout to the removable memory. FIGS. 19, 20 and 21 are schematic views showing a state of the flash memory 146 and the removable memory 156 changed by processings showing FIG. 18. Further, although FIGS. 19, 20 and 21 as well as FIG. 17, mentioned above, show cases when only one layout file set is present, the removable memory 156 can be stored with one or more of layout file sets and also the flash memory 146 can be stored with one or more of layout file sets. The processings shown in FIG. 18 are started by successively pushing the push button switch 120 and the push button 116 in the image taking mode and are made to proceed by executing a predetermined program stored in the flash memory 146 by CPU 142. That is, CPU 142 functions as a selection receiving unit, a layout inputting unit, an existing image inputting unit, an object image outputting unit, a layout outputting unit and an existing image outputting unit by executing the predetermined program stored in the flash memory 146.

At S800, selection of the layout and the existing image stored in the removable memory 156 is received. Further, at the time point, the flash memory 146 is not stored with the layout file set yet as shown by FIG. 19, and the layout file set is brought into a state of being stored only to the removable memory 156. Selection of the layout and the existing image is specifically received, for example, as follows. When the push button switch 120 and the push button switch 116 are successively pushed in the image taking mode, the identifier 123 of the layout file set stored in the removable memory 156 and the image 121 showing the content of the layout defining file based on the thumbnail for the camera stored in the removable memory 156 are displayed on LCD 154 as shown by the screen 15. When the upper or the lower end of the cross key 118 is pushed in the state of displaying the screen 15, the identifier 125 of the succeeding layout file set stored in the removable memory 156 and the image 127 expressing the content of the layout defining file are displayed on LCD 154 as shown by the screen 16. When the push button switch 116 is pushed in the state of displaying the identifier 123, 125 of the layout file set which is being selected currently and the image 121, 127 showing the content of the layout defining file as in the screen 15 or screen 16, the layout file set which is being selected is specified as the selected layout file set.

At S810, the selected layout and the selected existing image are inputted and stored in the flash memory 146. Specifically, CPU 142 reads the layout file set which is being selected from the removable memory 156 by controlling the memory controller when the push button switch 116 is pushed. Thereby, the layout and the existing image are inputted to the digital camera 101. Next, the read layout is stored in the flash memory 146 as shown by FIG. 17. According to the fifth embodiment, for example, when a remaining amount of a storing capacity of the flash memory 146 is reduced and the layout file set cannot be stored, or a total of data amounts of a plurality of layout file sets exceeds a previously set data amount, or when a number of layout file sets exceeds a previously set number, by defining that the lattermost the selected layout file set, the higher the possibility of being utilized most, and the lattermost selected layout file set is overwritten on a storing region stored with the most previously selected layout file set in the flash memory 146. That is, the layout file set is cached to the flash memory 146.

At S820, the operation returns to the image taking mode and the image 124 expressing a portion of the content of the layout defining file constituting the layout file set which is being selected and the layout file set cached to the flash memory 146, as well as the object moving image 126 and the menu 127 are synthesized to display as shown by the screen 17. The object moving image 126 is constituted by object images outputted from the image forming portion 136 at predetermined time intervals.

The processing of S830 is started when the shutter switch 162 is pushed in the image taking mode selecting the layout file set. At S830, the object image outputted from the image forming portion 136 and compressed by the compressing/decompressing portion 138 is stored in the removable memory 156 by the memory controller.

At S840, the relating file describing the file name of the index file of the layout file set which is being selected is stored in a folder the same as that of the object image. As a result, the object image related to the layout file set which is being selected is stored in the removable memory 156. The relating file is described with the file name of the index file and is attached with the file name the same as the file of the object image intended to the related to the layout defining file described in the index file. A file of the extender of ".ust" shown in FIG. 21 is the above-described related file. For example, the related file of "0003.ust" is described with a file name of "daen_0.usm". Further, the object image and the related file are related to each other by the file names. The related file and index file are related to each other by the file name described in the related file. The index file and the layout defining file are related to each other by the file name of the layout defining file described in the index file. By relating by the plurality of files, a plurality of layout defining files having different sheet sizes and brought into a relationship of being similar to each other are related to the single object image.

At S850, it is defined whether the cached layout file set is stored in the removable memory 156. When the cached file set has already been stored in the removable memory 156, the processings are finished. Although when there is allowance in a vacant capacity of the removable memory 156, it is not necessary to interchange the removable memory, when the vacant capacity is deficient, there is a case in which the removable memory 156 is interchanged after selecting the layout file set at S800 and before S830. However, the interchanged removable memory 156 is not necessarily stored with the layout file set which is being selected, and in many cases, as shown by FIG. 20, immediately after interchange, the layout file set which is being selected currently is not stored in the removable element 156 after having been interchanged. In this case, when the currently selected layout file set is stored in the removable memory 156 after having been interchanged, the object image can be made to be drawn by the selected layout. However, according to the fifth embodiment, it is not simply determined whether the layout file set which is being selected is stored in the removable memory 156 after having been interchanged but it is determined whether all of the cached layout file sets are stored in the removable memory 156. When even one of the cached layout file sets is not stored in the removable memory 156, the operation proceeds to S860.

At S860, as shown by FIG. 21, the layout file set of the cached layout file sets which is not stored in the removable memory 156 is stored in the removable memory 156. When the cached layout file set is stored in the removable memory 156, the object image can be drawn by the layout file set which is being selected currently and the object image can be recorded drawably separately from the selected layout file set. Further, when, for example, the layout file set which has been selected at a preceding time is intended to utilize again after interchanging the removable memory 156, it is not necessary to interchange again the removable memory 156 stored with the layout file set which has been selected at the preceding time and therefore, time and labor in utilizing again the layout file set which has been selected at the preceding time can be reduced.

Further, although according to the fifth embodiment, the layout file set is stored in the removable memory 156 after storing the object image to the removable memory 156, the layout file set may be stored in the removable memory 156 before storing the object image. For example, it may be detected that the removable memory 156 is interchanged and at a time point of detecting the interchange, the cached layout file set may be stored in the removable memory 156 after having been interchanged.

The fifth embodiment of the invention is substantially the same as the first embodiment in other respect.

According to the digital camera 101 of the fifth embodiment of the invention, the layout file set stored in the removable memory 156 can be selected and therefore, a user can select a variety of layout file sets.

Further, according to the fifth embodiment, the selected layout file set is stored in the flash memory 146 and therefore, there is not brought about a drawback that even when the layout file set is selected from the removable memory 156 and the removable memory 156 is interchanged after the selection, the object image cannot be related to the layout file set which has been selected before the interchange. Therefore, the user can successively utilize the layout file set which has been selected before the interchange even when the removable memory 156 is interchanged. Further, when the layout file set is successively utilized, the user is not requested to execute any operation for successively utilizing the layout file set and time and labor of the user when a plurality of the removable memories 156 are utilized while being interchanged is reduced.

Further, according to the fifth embodiment, the digital image of the object and the layout file set are outputted to the removable memory 156 by being related to each other and therefore, in a drawing apparatus of a display, a printer or the like, the object image can firmly be drawn in accordance with the selected layout file set.

Further, although according to the fifth embodiment, the input/output portion 150 and the removable memory 156 are used also as an external storing unit, the external storing unit may be provided with other apparatus other than the digital camera 101. Specifically, for example, the digital camera 101 maybe made to be able to be connected to a network by communicating units of Bluetooth or the like and selection of the layout file set stored in a magnetic disk apparatus of a hard disk drive or the like provided to other apparatus connected to the net work may be received.

Further, although according to the fifth embodiment, when the layout file set is selected from the removable memory 156, the layout file set is always stored in the flash memory 146, the user may be made to be able to set whether the selected layout file set is stored in the flash memory 146, that is, whether the layout file set is cached. For example, when there is a layout file set which is successively utilized while interchanging the removable memory 156 and a layout file set which is utilized unsuccessively only by once, when the layout file set which is successively utilized is overwritten on the layout file set which is utilized unsuccessively, in the case of using the layout file set which is utilized successively, a user is requested to take time and labor that the layout file set needs to be selected again by interchanging the removable memory 156 stored with the layout file set. When a user is made to be able to set whether the layout file set is cached, time and labor of selection can be reduced.

The invention claimed is:

1. A digital camera comprising:
a digital image unit that generates a digital image based on an optical image of an object;
an internal memory in which an existing image is stored;
a selection receiving unit that receives selection of the existing image stored in the internal memory;
an object image outputting unit that outputs the digital image to a removable memory and that relates the digital image to the selected existing image; and
a determining unit that determines whether an existing image, which is identical to the selected existing image, is stored in the removable memory,
wherein, if the determining unit determines that the existing image, which is identical to the selected existing image, is stored in the removable memory, then the selected existing image is not output to the removable memory, and
wherein if the determining unit determines that the existing image, which is identical to the selected existing image, is not stored in the removable memory, then the selected existing image is output to the removable memory.

2. The digital camera according to claim 1 further comprising an existing image outputting unit that outputs the selected existing image to the removable memory before the digital image is outputted to the removable memory.

3. . The digital camera according to claim 1 further comprising an existing image outputting unit that outputs the selected existing image to the removable memory, at each time of interchanging the removable memory.

* * * * *